(12) United States Patent
Novak et al.

(10) Patent No.: US 9,191,394 B2
(45) Date of Patent: Nov. 17, 2015

(54) PROTECTING USER CREDENTIALS FROM A COMPUTING DEVICE

(75) Inventors: Mark F. Novak, Newcastle, WA (US); Andrew J. Layman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 676 days.

(21) Appl. No.: 13/368,731

(22) Filed: Feb. 8, 2012

(65) Prior Publication Data
US 2013/0205360 A1 Aug. 8, 2013

(51) Int. Cl.
*H04L 29/06* (2006.01)
(52) U.S. Cl.
CPC .............. *H04L 63/102* (2013.01); *H04L 63/083* (2013.01); *H04L 63/0853* (2013.01)
(58) Field of Classification Search
CPC ............ G06F 21/6218; G06F 21/6263; G06F 21/604; G06F 21/606; G06F 21/6236; G06F 2221/2115; G06F 2221/2141; H04L 67/14; H04L 67/141; H04L 67/142; H04L 67/146; H04L 67/148; H04L 63/0884; H04L 63/166; H04L 63/0823; H04L 63/205; H04L 9/3226; H04L 9/3202; H04L 9/3213; H04L 9/3221; H04L 9/3228; H04L 2209/42; H04L 2209/50; H04L 2209/56
USPC ............................................................ 726/1
See application file for complete search history.

(56) References Cited

U.S. PATENT DOCUMENTS

| 7,200,665 B2 | 4/2007 | Eshghi et al. |
| 7,454,356 B2 * | 11/2008 | Fields et al. ................... 705/330 |
| 7,461,398 B2 * | 12/2008 | Aaron ................................. 726/6 |
| 7,493,650 B2 * | 2/2009 | Peled et al. ....................... 726/1 |

(Continued)

FOREIGN PATENT DOCUMENTS

EP     1924047     4/2012

OTHER PUBLICATIONS

Koshutanski, H., et al, 'Towards User-centric Identity Interoperability for Digital Ecosystems', Intl. Journal on Advances in Security, vol. 1 No. 1, 2008, entire document, http://www.koshutanski.net/Publications/kosh-ion-telesca-08-IARIA-IJAS.pdf.*

(Continued)

*Primary Examiner* — Christopher Brown
*Assistant Examiner* — Ronald Baum
(74) *Attorney, Agent, or Firm* — Sunah Lee; Kate Drakos; Micky Minhas

(57) ABSTRACT

Protecting user credentials from a computing device includes establishing a secure session between a computing device and an identity provider (e.g., a Web service). Parameters of the secure session are communicated to a credential service, which renegotiates or resumes the secure session to establish a new secure session between the credential service and the identity provider. User credentials are passed from the credential service to the identity provider via the new secure session, but the computing device does not have the parameters of the new secure session and thus does not have access to the passed user credentials. The credential service then renegotiates or resumes the secure session again to establish an additional secure session between the credential service and the identity provider. Parameters of the additional secure session are communicated to the computing device to allow the computing device to continue communicating securely with the identity provider.

20 Claims, 8 Drawing Sheets

(56) References Cited

U.S. PATENT DOCUMENTS

| | | | |
|---|---|---|---|
| 7,869,591 | B1* | 1/2011 | Nagel et al. .................. 380/28 |
| 8,219,808 | B2* | 7/2012 | Belohoubek et al. ......... 713/168 |
| 8,700,729 | B2* | 4/2014 | Dua .............................. 709/217 |
| 8,984,597 | B2 | 3/2015 | Hatlelid et al. |
| 2003/0023880 | A1* | 1/2003 | Edwards et al. .............. 713/201 |
| 2003/0046391 | A1* | 3/2003 | Moreh et al. .................. 709/225 |
| 2003/0084168 | A1* | 5/2003 | Erickson et al. .............. 709/229 |
| 2003/0097331 | A1* | 5/2003 | Cohen ............................ 705/39 |
| 2003/0158960 | A1* | 8/2003 | Engberg ......................... 709/237 |
| 2003/0172090 | A1* | 9/2003 | Asunmaa et al. .............. 707/200 |
| 2003/0172280 | A1* | 9/2003 | Scheidt et al. ................ 713/182 |
| 2004/0088578 | A1 | 5/2004 | Chao et al. |
| 2004/0123159 | A1* | 6/2004 | Kerstens et al. .............. 713/202 |
| 2005/0131839 | A1* | 6/2005 | Cordery et al. ................ 705/78 |
| 2005/0177867 | A1 | 8/2005 | Toutonghi |
| 2005/0198380 | A1* | 9/2005 | Panasyuk et al. ............. 709/239 |
| 2005/0283608 | A1* | 12/2005 | Halcrow et al. .............. 713/175 |
| 2006/0041759 | A1 | 2/2006 | Kaliski, Jr. et al. |
| 2006/0129817 | A1 | 6/2006 | Borneman et al. |
| 2006/0206932 | A1* | 9/2006 | Chong ............................ 726/10 |
| 2006/0236382 | A1* | 10/2006 | Hinton et al. .................... 726/8 |
| 2007/0143851 | A1* | 6/2007 | Nicodemus et al. ............ 726/25 |
| 2007/0204168 | A1 | 8/2007 | Cameron et al. |
| 2007/0234417 | A1 | 10/2007 | Blakley, III et al. |
| 2008/0091950 | A1 | 4/2008 | Hofmann et al. |
| 2008/0130523 | A1* | 6/2008 | Fridman et al. ............... 370/259 |
| 2008/0141333 | A1* | 6/2008 | Chen et al. ...................... 726/1 |
| 2008/0155267 | A1* | 6/2008 | Lieber ........................... 713/183 |
| 2008/0189778 | A1 | 8/2008 | Rowley |
| 2008/0229384 | A1 | 9/2008 | Hodgkinson et al. |
| 2008/0313719 | A1 | 12/2008 | Kaliski et al. |
| 2009/0249439 | A1 | 10/2009 | Olden et al. |
| 2009/0292927 | A1 | 11/2009 | Wenzel et al. |
| 2009/0328141 | A1 | 12/2009 | Zhang et al. |
| 2010/0122333 | A1 | 5/2010 | Noe |
| 2010/0146611 | A1 | 6/2010 | Kuzin et al. |
| 2010/0325441 | A1 | 12/2010 | Laurie et al. |
| 2011/0026704 | A1* | 2/2011 | Connelly et al. .............. 379/219 |
| 2011/0247045 | A1 | 10/2011 | Rajagopal et al. |
| 2011/0265172 | A1 | 10/2011 | Sharma et al. |
| 2011/0270751 | A1 | 11/2011 | Csinger et al. |
| 2011/0296510 | A1 | 12/2011 | Hatlelid et al. |
| 2012/0023556 | A1* | 1/2012 | Schultz et al. .................... 726/4 |
| 2012/0023558 | A1* | 1/2012 | Rafiq ................................ 726/6 |
| 2012/0284786 | A1* | 11/2012 | Somani et al. .................... 726/7 |

OTHER PUBLICATIONS van Delft, B., et al, 'A Security Analysis of OpenID', 2010, Comp. Sci.Dept., Radboud Univ., entire document, http://dl.ifip.org/db/conf/idman/idman2010/DelftO10.pdf.*

"Non-Final Office Action", U.S. Appl. No. 12/789,160, (May 23, 2012),15 pages.

"CAS—Central Authentication Service", Retrieved from: <http://www.jusfortechies.com/cas/protocol.html> on Mar. 16, 2010, (2009), 9 pages.

"OpenSSO Architecture Overview", Retrieved from: <http://wikis.sun.com/display/OpenSSO/OpenSSO+Architecture+Overview#OpenSSOArchitectureOverview-4.8Security%3ACredentialsandDelegation> on Mar. 16, 2010, (Jan. 18, 2010),9 pages.

"RoboForm Enterprise Password Management: Solutions Overview", Retrieved from: <http://www.roboform.com/enterprise/solutions/overview> on Apr. 20, 2010, (2010),3 pages.

"RoboForm", Retrieved from: <http://www.roboform.com/tutorial-password.html> on Apr. 20, 2010, 2 pages.

Kondi, Shesh "OpenSSO and Secure SOA", *Sun Microsystems*, Available at <http://wikis.sun.com/download/attachments/64224471/OpenSSO-SSOA.pdf>,(Mar. 2009),29 pages.

Mizuno, Shintaro et al., "A Mobile Phone Based Authentication Service for Home Appliances", *Consumer Communications and Networking Conference*, 2007, Available at <http://ieeexplore.ieee.org/stamp/stamp.jsp?tp=&arnumber=4199324>,(Jan. 13, 2007),pp. 1168-1169.

Rescorla, E. et al., "Transport Layer Security (TLS) Renegotiation Indication Extension", Internet Engineering Task Force (IETF), RFC 5746, Available at <http://tools.ietf.org/html/rfc5746>,(Feb. 2010),pp. 1-15.

"Final Office Action", U.S. Appl. No. 12/789,160, (Dec. 6, 2012),16 pages.

"International Search Report", Mailed Date: May 14, 2013, Application No. PCT/US2013/022611, Filed Date: Jan. 23, 2013, pp. 9.

"Notice of Allowance", U.S. Appl. No. 12/789,160, Oct. 15, 2014, 7 pages.

"Non-Final Office Action", U.S. Appl. No. 12/789,160, Nov. 21, 2013, 17 pages.

Jsang, et al., "Usability and Privacy in Identity Management Architectures", Retrieved at <<http://portal.acm.org/citation.cfm?id=1274548>>, 2007, pp. 143-152.

"Building a Custom Security Token Service", Retrieved at << http://msdn.microsoft.com/en-us/magazine/dd347547.aspx >>, Retrieved Date: Nov. 22, 2011, pp. 12.

"Identity Manager and the Single Sign-on Service", Retrieved at << http://msdn.microsoft.com/en-us/library/bb972911.aspx >>, Retrieved Date:Nov. 22, 2011, pp. 4.

"Final Office Action", U.S. Appl. No. 12/789,160, May 22, 2014, 15 pages.

Salowey, J. et al., "Transport Layer Security (TLS) Session Resumption without Server-Side State", *Network Working Group*, RFC 5077, Available at <http://tools.ietf.org/html/rfc5077>,(Jan. 2008),pp. 1-21.

Vassilev, Apostol T., et al., "Personal Brokerage of Web Service Access", *IEEE Security and Privacy*vol. 5, Issue 5, Available at <http://ieeexplore.ieee.org/stamp/stamp.jsp?tp=&arnumber=4336275>,(Oct. 2007), pp. 24-31.

"Extended European Search Report Received for European Patent Application No. 13746559.7", Mailed Date: Sep. 18, 2015, 6 Pages.

* cited by examiner

PROTECTING USER CREDENTIALS FROM A COMPUTING DEVICE

BACKGROUND

As computers have become increasingly commonplace, it has become desirable for users to access resources or other services on the World Wide Web (also referred to as simply the Web) from a variety of different computers. These resources or other services oftentimes require a user to provide user credentials, such as a user name and password, in order to access the resource or service. Users oftentimes desire to access these resources from multiple different computers, many of which may not be trusted by the user because they do not belong to the user. Furthermore, even computers that may be trusted by the user can become infected by a malicious program. User credentials entered by the user are thus exposed to a level of risk due to theft by a malicious program, reducing the security of such resources or other services and the overall Web as well.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request to provide user credentials associated with a user of a computing device to an identity provider is received (e.g., by a credential service) from the computing device. Secure session parameters for a first secure session between the computing device and the identity provider are also received. The first secure session is renegotiated or resumed from the credential service, resulting in a second secure session between the credential service and the identity provider. The user credentials associated with the user are provided to the identity provider via the second secure session.

In accordance with one or more aspects, a request for user credentials of a user of a computing device is received from an identity provider. A user request for the user credentials associated with the identity provider to be provided by a credential service is also received. In response to the user request, secure session parameters for a first secure session between the computing device and the identity provider are provided to the credential service. The user credentials, received from the credential service, are communicated to the identity provider via a second secure session between the credential service and the identity provider.

BRIEF DESCRIPTION OF THE DRAWINGS

The same numbers are used throughout the drawings to reference like features.

DETAILED DESCRIPTION

Protecting user credentials from a computing device is discussed herein. The user can be any of a variety of different security principals. A secure session is established between a computing device and an identity provider (e.g., a Web service). Parameters, such as one or more keys, of the secure session are communicated to a credential service, allowing the credential service to securely communicate with the identity provider. The credential service establishes a new secure session between the credential service and the identity provider, and user credentials are passed from the credential service to the identity provider via the new secure session. The computing device does not have the parameters of the new secure session and thus does not have access to the passed user credentials. The credential service then establishes an additional secure session between the credential service and the identity provider. Parameters, such as one or more keys, of the additional secure session are communicated to the computing device. The computing device is thus able to continue communicating securely (via the additional secure session) with the identity provider, even though the user credentials were provided to the identity provider without the computing device having knowledge of the user credentials.

Figure 1:
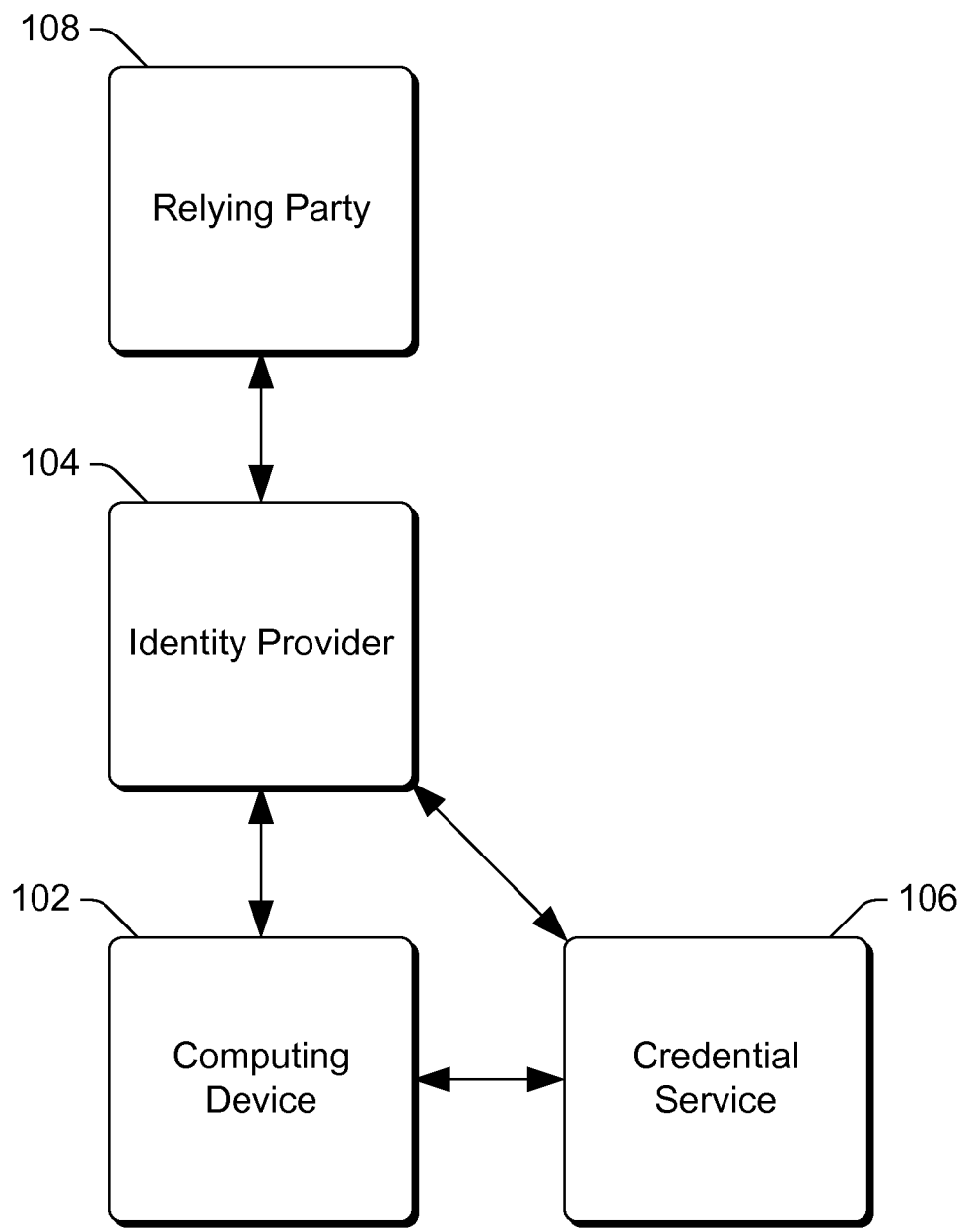
FIG. 1 illustrates an example system protecting user credentials from a computing device in accordance with one or more embodiments.

FIG. 1 illustrates an example system 100 protecting user credentials from a computing device in accordance with one or more embodiments. System 100 includes a computing device 102, an identity provider 104, a credential service 106, and a relying party 108, each of which is implemented by one or more of a variety of different types of computing devices. For example, each of computing device 102, identity provider 104, credential service 106, and relying party 108 can be implemented by a desktop computer, a server computer, a computing cluster (e.g., a network or cloud service), a mobile station, an entertainment appliance, a set-top box communicatively coupled to a display device, a television, a laptop or netbook computer, a notepad or tablet computer, a cellular or other wireless phone, a game console, an automotive computer, and so forth. Although system 100 is illustrated with one computing device 102, one identity provider 104, one credential service 106, and one relying party 108, system 100 can include any number of computing devices 102, any number of identity providers 104, any number of credential services 106, and any number of relying parties 108.

Computing device 102 receives user inputs from a user of computing device 102. The user (also referred to as a security principal) is oftentimes a human, but can alternatively be one or more of various other forms, such as a computer (e.g., computing device 102 itself), another device coupled to or communicating with computing device 102, an aggregate (e.g., multiple user and/or multiple devices), and so forth. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, an action that can be recognized by a motion detection component of device 102 (such as shaking device 102, rotating device 102, etc.), bending or folding device 102, and so forth. User inputs can also be provided in other manners, such as via voice or other audible inputs to a microphone, via motions of hands or other body parts observed by an image capture device, and so forth.

Computing device 102, identity provider 104, credential service 106, and relying party 108 can communicate with one another via a variety of different networks, such as the Internet, a local area network (LAN), a phone network, an intranet, other public and/or proprietary networks, combinations thereof, and so forth. One or more of computing device 102, identity provider 104, credential service 106, and relying party 108 can also communicate with one another using different protocols or technologies, such as universal serial bus (USB) connections, wireless USB connections, infrared connections, Bluetooth connections, and so forth.

Relying party 108 can be any of a variety of different services or resources that computing device 102, or a user (e.g. of computing device 102), may desire to access. Identity provider 104 provides authentication functionality for a relying party 108. For example, relying party 108 can be a Web service that provides information or other relying party services, such as a social networking Web service, an email Web service, a merchant Web service, a bank or other financial institution Web service, and so forth. By way of another example, relying party 108 can provide access to other functionality or networks, such as access to a corporate network, access to a bank account, and so forth. Relying party 108 can also be a resource or an interface of a resource that computing device 102, or a user of computing device 102, may desire to access, such as a file share, a printer or other output device, a camera or other input device, and so forth.

In order to access at least some of the functionality of relying party 108, user credentials are provided to identity provider 104. In the case of a user that is an aggregate (e.g., multiple user and/or multiple devices), the user credentials of an aggregate can refer to the aggregate as a unit and/or be composed of the credentials of its members These user credentials can be a user name (also referred to as a user ID) and password for identity provider 104. Alternatively these user credentials can be other types of user credentials, such as biometric data (e.g., fingerprint scans, retina scans, face scans, etc.), a digital certificate and/or other identifying data obtained from a smartcard of the user, other identifiers, certificates or tokens, and so forth. These user credentials authenticate the identity and/or role of a user of computing device 102 to identity provider 104. Which user credentials are used can vary based on the manner in which identity provider 104 is implemented and/or the desires of the user. For example, if the user prefers that biometric data not be used as user credentials, then the user can select other user credentials to be used and/or choose not to access identity provider 104.

Generally, a user of computing device 102 has an associated user account on credential service 106, also referred to herein as a credential service user account. Credential service 106 maintains, for each credential service user account, user credentials for a user account associated with identity provider 104, and optionally user accounts associated with one or more additional identity providers. In one or more embodiments, when user credentials are to be provided to identity provider 104, a secure session between identity provider 104 and computing device 102 is established. Computing device 102 provides secure session parameters for the secure session to credential service 106. Credential service 106 renegotiates the secure session, resulting in a new secure session between identity provider 104 and credential service 106 via computing device 102. The new secure session has new secure session parameters that are unknown to computing device 102. Credential service 106 provides the user credentials associated with identity provider 104 to identity provider 104 via this new secure session, and then renegotiates the secure session an additional time. Secure session parameters for this additional secure session are provided to computing device 102, allowing computing device 102 to proceed with communications with identity provider 104 as desired with the user of computing device 102 having been authenticated to identity provider 104 with the user credentials associated with identity provider 104.

Alternatively, rather than renegotiating a secure session, credential service 106 can resume the previous secure session for which the secure session parameters were provided to credential service 106 by computing device 102. Secure session resumption differs from secure session renegotiation in that with secure session renegotiation all of the keys included in the secure session parameters (and/or keys from which the keys included in the secure session parameters) are re-generated. With secure session resumption, however, one or more of the keys included in the secure session parameters (and/or keys from which the keys included in the secure session parameters) are re-used and need not be re-generated by the credential service 106 and/or identity provider 104. Furthermore, with secure session renegotiation credential service 106 and identity provider 104 can (but need not) communicate with computing device 102 operating as an intermediary, whereas with secure session resumption credential service 106 and identity provider 104 communicate with one another bypassing computing device 102.

It should also be noted that various combinations of secure session resumption and secure session renegotiation can be performed. For example, credential service 106 could first resume the session, and then renegotiate the session. It should further be noted that other techniques other than secure session negotiation and/or secure session resumption can be used. Credential service 106 can use any technique that allows computing device 102 to provide the secure session parameters to credential service 106, and allows credential service 106 to leverage those secure session parameters in some manner to securely transmit user credentials from credential service 106 to identity provider 104 without computing device 102 being able to see or know the user credentials.

Although discussed herein primarily with reference to user credentials, it should be noted that credential service 106 can alternatively provide (in addition to or in place of user credentials), additional user-specific information to identity provider 104 analogous to providing user credentials as discussed in more detail below. This additional user-specific information can include various information regarding a user of computing device 102 and/or a user account associated with identity provider 104, such as a shipping address, a billing address, a contact phone number, a credit card number, and so forth. In one or more embodiments such additional user-specific information is maintained and provided by credential service 106 only if requested by the user of computing device 102. For example, the additional user-specific information can be provided by (or with authorization from) the user, and thus can be maintained only if the user provides or authorizes maintaining of the information. Furthermore, in one or more embodiments the additional user-specific information is provided to identity provider 104 by credential service 106 only in response to a user input (e.g., selection of a menu option, button, icon, link, etc.) indicating the user's desire to have the additional user-specific information provided to identity provider 104, analogous to the providing of user credentials to identity provider 104 as discussed in more detail below.

Figure 2:
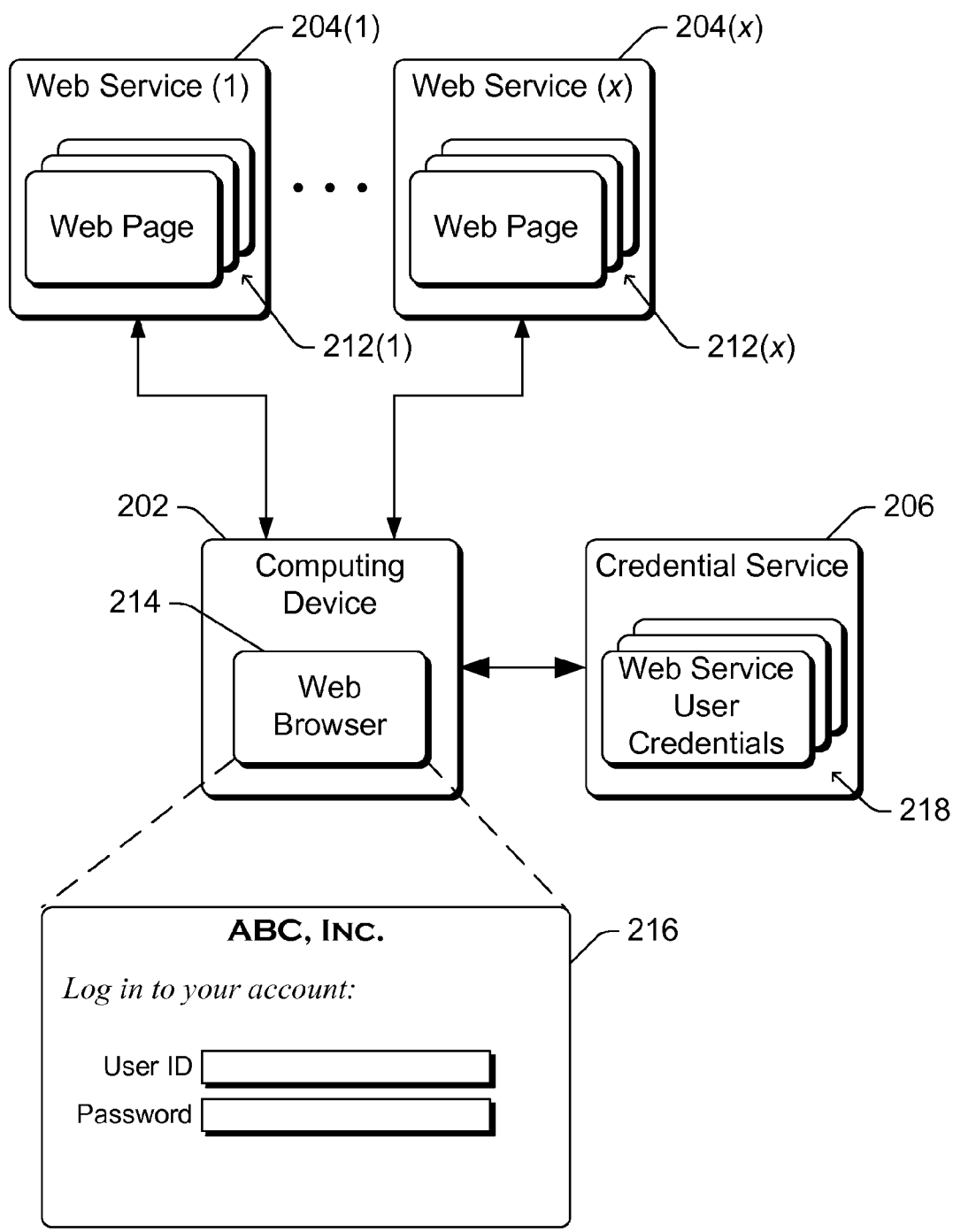
FIG. 2 illustrates another example system protecting user credentials from a computing device in accordance with one or more embodiments.

FIG. 2 illustrates an example system 200 protecting user credentials from a computing device in accordance with one or more embodiments. System 200 is similar to system 100 of FIG. 1, including a computing device 202, multiple (x) Web services 204, and a credential service 206. Computing device 102 is an example of a computing device 102 of FIG. 1, Web services 204 are each examples of an identity provider 104 of FIG. 1 (or combinations of identity provider 104 and relying party 108 of FIG. 1), and credential service 206 is an example of a credential service 106 of FIG. 1. Although FIG. 2 discusses an example system with reference to a Web service, it should be noted that the techniques discussed with reference to FIG. 2 can also be used with other identity providers (e.g., identity providers 104 of FIG. 1).

Each Web service 204 hosts one or more Web pages 212, making these Web pages available to computing device 202. Computing device 202 includes a Web browser 214 that receives Web pages 212 from Web services 204, typically displaying or otherwise presenting the received Web pages at computing device 202. In one or more embodiments, Web browser 214 automatically detects when a Web page received at computing device 202 is requesting user credentials.

System 200 illustrates an example Web page 216 requesting user credentials. Web page 216 is a Web page 212 received from a Web service 204 and displayed by Web browser 214. As illustrated, Web page 216 is requesting user credentials that are a user ID and password. Web page 216 includes prompts and data entry fields for a user of computing device 202 to enter a user ID and password for the user's account with the ABC, Inc. company or service.

Web browser 214 can automatically detect that a Web page received at computing device 202 is requesting user credentials in different manners. In one or more embodiments, Web browser 214 analyzes received Web pages and identifies Web pages including prompts and/or data entry fields for user credentials, such as prompts and/or data entry fields for a user ID, a user identifier, a user email address, a password, a personal identification number (PIN) value, and so forth. This analysis and identification can be performed in different manners, such as by analyzing the source description (e.g., HTML (HyperText Markup Language) or other markup language) of the Web page for tags including "user ID", "user identifier", "password", and so forth, by analyzing the displayed Web page for the text "user ID", "user identifier", "password", and so forth. Alternatively, the Web page may include a tag or value indicating to Web browser 214 that the Web page is requesting user credentials. Alternatively, Web service 204 can provide an indication separate from the Web page that the Web page is requesting user credentials (e.g., Web service 204 may provide one Web page or other signal indicating that the next Web page received from Web service 204 will be requesting user credentials). Alternatively, Web browser 214 can be configured with or otherwise have knowledge of the manner in which Web service 204 requests user credentials.

In response to detecting a Web page requesting user credentials, Web browser 214 prompts a user of computing device 202 that the user credentials can be provided by credential service 206. For example, a menu option, button, icon, link. etc. can be displayed indicating user credentials can be provided by credential service 206, and the user of computing device 202 can select the menu option, button, icon, link, etc. to indicate his or her desire that the user credentials be provided by credential service 206. Alternatively, in response to detecting a Web page requesting user credentials, Web browser 214 can automatically indicate to credential service 206 that credential service 206 is to provide the user credentials.

Rather than Web browser 214 automatically detecting that the Web page is requesting user credentials, a user of computing device 202 can alternatively indicate that the Web page is requesting user credentials. This indication can be provided in various manners. For example, Web browser 214 can deem a particular user input (e.g., selection of a particular menu option, performing a particular gesture, etc.) as being a user request to have credential service 206 provide user credentials for the user. In response to such a user input, Web browser 214 can determine that the Web page is requesting user credentials, and can indicate to credential service 206 that credential service 206 is to provide the user credentials.

Although discussed with reference to Web pages in FIG. 2, it should be noted that credential service 206 can similarly automatically detect, or receive a user indication, that a page or other request from an identity provider (e.g., an identity provider 104 of FIG. 1) is requesting user credentials.

Credential service 206 maintains Web service user credentials 218 for web services 204. Web service user credentials 218 can include user credentials for any number of users (any number of credential service user accounts) of any number of computing devices 202 and any number of Web services 204. A user of computing device 202 has a credential service user account on credential service 206, and to log into his or her credential service user account a user of computing device 202 authenticates himself or herself to credential service 206. This authentication can be performed prior to receiving Web page 216 and/or after receiving Web page 216. The user can authenticate himself or herself to the credential service 206 in a variety of different manners, such as by proving to credential service 206 that the user possesses valid credentials, such as knowledge of a secret phrase (e.g., a password or personal identification number (PIN)), particular characteristics (e.g., a fingerprint), a private key corresponding to a certificate (e.g., a smart card or Trusted Platform Module (TPM)-based authentication (e.g., based on the TPM Main Specification 1.2 Revision 116, March 2011, available from the Trusted Computing Group)), a temporal secret (e.g., a one-time password), and so forth. The manner in which the user authenticates himself or herself to credential service 206 can vary based on the manner in which credential service 206 is implemented and/or the desires of the user. For example, if the user prefers that a fingerprint not be used to authenticate the user, then the user can select other manners in which to authenticate himself or herself to credential service 206 and/or choose not to use credential service 206.

Credential service 206 associates one or more sets of user credentials of a user of computing device 202 (by his or her credential service user account) with a particular Web service 204. The user credentials are initially provided to credential service 206 by the user of computing device 202, or alternatively by another device or service (e.g., with permission from the user of computing device 202), or can be generated by credential service 206, and are maintained by credential service 206. The user can provide his or her user credentials for a particular Web service 204 only once, as the user credentials are maintained by credential service 206. When a Web page is received at computing device 202 requesting user credentials, and credential service 206 is to provide the user credentials, credential service 206 identifies the user credentials associated with the user of computing device 202 and the Web service 204 from which the Web page was received. The Web service 204 from which the Web page was received can be identified in different manners, such as being included as part of a Uniform Resource Locator (URL) or other identifier of the Web page, being included as a tag or other identifier in the source description (e.g., HTML or other markup language) of the Web page, and so forth.

Credential service 206 automatically enters the user credentials for the user of computing device 202 for Web page 216. Alternatively, if credential service 206 maintains multiple sets of user credentials associated with Web service 204 for the user, then the user can be given a choice of which of the multiple sets of user credentials to user (or one of the sets can be selected by credential service 206, such as based on a configuration setting or input previously provided by the user to credential service 206). The particular user credentials entered by credential service 206 are dependent on the user credentials requested by the Web page. For example, a user ID and password are entered for the user of computing device 202 on Web page 216. The user credentials are entered on Web page 216 by credential service 206 and provided to Web service 204 via computing device 202 without computing device 202 having knowledge of the user credentials, as discussed in more detail below.

Figure 3:
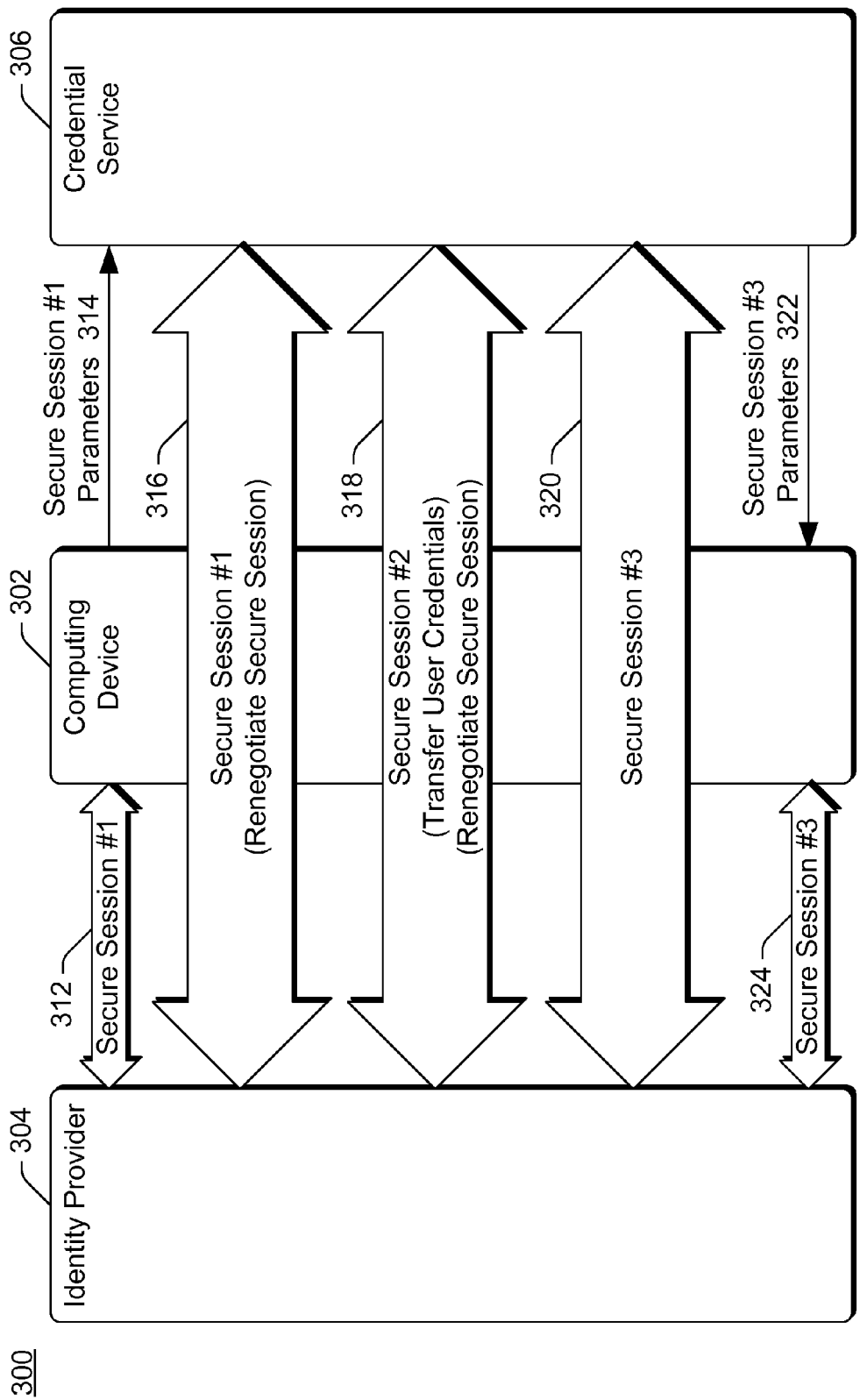
FIG. 3 illustrates another example system protecting user credentials from a computing device in accordance with one or more embodiments.

FIG. 3 illustrates an example system 300 protecting user credentials from a computing device in accordance with one or more embodiments. System 300 is similar to system 100 of FIG. 1 and system 200 of FIG. 2, including a computing device 302, an identity provider 304, and a credential service 306. Computing device 302 is an example of a computing device 102 of FIG. 1 and/or computing device 202 of FIG. 2, identity provider 304 is an example of an identity provider 104 of FIG. 1 and/or Web service 204 of FIG. 2, and credential service 306 is an example of a credential service 106 of FIG. 1 and/or credential service 206 of FIG. 2.

A secure session refers to a secure connection between two entities, such as between identity provider 304 and computing device 302, between identity provider 304 and credential service 306, and so forth. A secure session is protected against other entities (other than the two between which the secure session is established) seeing or tampering with data transferred via the secure session. The secure session can be implemented in any of a variety of different manners, typically using one or more security keys to encrypt and/or decrypt data communicated via the secure session. In one or more embodiments, the secure session is implemented using Secure Sockets Layer (SSL) or Transport Layer Security (TLS) as the transport, although other secure communication techniques can alternatively be used. Thus, although other parties can see the encrypted data, the other parties do not know the session keys and thus cannot see or modify the data.

A secure session has one or more associated secure session parameters. These secure session parameters can include one or more keys (e.g., one or more SSL keys), one or more cookies, one or more certificates, and so forth. These parameters are associated with a secure session and are thus also referred to as secure session parameters, although not all of these parameters need be safeguarded (e.g., SSL keys are typically kept secure, while cookies typically need not be). The particular secure session parameters associated with a secure session include parameters sufficient to implement the secure session, and can optionally include one or more additional parameters. For example, for a HyperText Transfer Protocol Secure (HTTPS) connection, the secure session parameters include one or more SSL or TLS keys and one or more cookies. Secure session parameters for a secure session implemented using SSL keys typically include a single master key, four session keys (for encryption and signing in each direction) derived from the single master key, a state (sequence numbers) that is not security-sensitive (and need not be safeguarded), and a channel binding token (the TLS "Finished" message from the previous session being renegotiated).

When user credentials are to be provided to identity provider 304, a secure session is established between identity provider 304 and computing device 302. This secure session is illustrated as secure session #1 (312) in FIG. 3. Computing device 302 provides secure session parameters 314 to credential service 306. Secure session parameters 314 are the secure session parameters associated with secure session #1. Various additional information can also be provided by computing device 302 to credential service 306, to facilitate credential service 306 providing user credentials to identity provider 304. The particular additional information provided can vary depending on the manner in which user credentials are requested and/or are provided to identity provider 304. For example, if user credentials are requested by a Web page (e.g., Web page 216 of FIG. 2), then the additional information can include various Web page state, such as a JavaScript state, cookies, document object module (DOM) storage, Flash storage, and so forth.

With knowledge of the secure session parameters associated with secure session #1, credential service 306 can read data sent by identity provider 304 via secure session #1 and also send data to identity provider 304 via secure session #1. Credential service 306 can communicate with identity provider 304 via secure session #1 using computing device 302 as an intermediary, illustrated as secure session #1 (316) in FIG. 3. Using computing device 302 as an intermediary, data from identity provider 304 is communicated to computing device 302 via secure session #1 and then communicated from computing device 302 to credential service 306 via secure session #1, and data from credential service 306 is communicated to computing device 302 via secure session #1 and then communicated from computing device 302 to identity provider 304 via secure session #1. Computing device 302 being an intermediary refers to computing device 302 simply passing data received from identity provider 304 via the secure session on to credential service 306, and passing data received from credential service 306 via the secure session on to identity provider 304.

With computing device 302 operating as an intermediary between identity provider 304 and credential service 306, identity provider 304 sends data to and receives data from computing device 302. Identity provider 304 need have no knowledge of (but alternatively can have knowledge of) credential service 306 and/or that data is being provided to identity provider 304 by credential service 306 because the data is received by identity provider 304 from computing device 302. Similarly, identity provider 304 need have no knowledge (but alternatively can have knowledge) that data provided to computing device 302 from identity provider 304 is being passed on to credential service 306. Thus, effectively identity provider 304 believes that identity provider 304 is communicating with computing device 302 rather than credential service 306.

Credential service 306 then renegotiates secure session #1. This renegotiation results in a new secure session being established between identity provider 304 and credential service 306, and is illustrated as secure session #2 (318) in FIG. 3. Renegotiating a secure session refers to generating one or more new secure session parameters (e.g., one or more security keys) for a secure session. Renegotiating a secure session can be performed in various manners using various techniques that are known to the parties involved (e.g., credential service 306 and identity provider 304). For example, secure session renegotiation can be performed using SSL renegotiation, or renegotiation as discussed in Internet engineering Task Force RFC 5746, "Transport Layer Security (TLS) Renegotiation Extension", February 2010.

The renegotiation of the secure session is done between identity provider 304 and credential service 306 with computing device 302 as an intermediary. Thus, although the renegotiation is performed between identity provider 304 and credential service 306, identity provider 304 continues to communicate with computing device 302 and need have no knowledge that secure session #2 is established with credential service 306 rather than computing device 302. However, because the renegotiation of the secure session is done between identity provider 304 and credential service 306 and computing device 302 is an intermediary, computing device 302 does not have knowledge of the secure session parameters associated with secure session #2.

Credential service 306 provides the requested user credentials to identity provider 304 via secure session #2. The user credentials can be provided in any of a variety of different manners, such as using an HTTPS Post request, using a HyperText Transport Protocol (HTTP) Put request, using a JavaScript Submit method, using a Basic authentication scheme, using a Digest authentication scheme, and so forth. Alternatively, user credentials can be provided in other manners based on the nature of the user credentials themselves (e.g., for a digital certificate credential the establishment of the secure session itself can provide the user credential). Identity provider 304 thus receives the user credentials as if the user credentials were provided by computing device 302, although computing device 302 does not have knowledge of the user credentials.

Credential service 306 then renegotiates secure session #2. This renegotiation results in a new secure session being established between identity provider 304 and credential service 306, and is illustrated as secure session #3 (320) in FIG. 3. The renegotiation of the secure session is done between identity provider 304 and credential service 306 with computing device 302 as an intermediary. Thus, although the renegotiation is performed between identity provider 304 and credential service 306, identity provider continues to communicate with computing device 302 and need have no knowledge that secure session #3 is established with credential service 306 rather than computing device 302. However, because the renegotiation of the secure session is done between identity provider 304 and credential service 306 and computing device 302 is an intermediary, computing device 302 does not have knowledge of the secure session parameters associated with secure session #3.

Credential service 306 provides secure session parameters 322 to computing device 302. Secure session parameters 322 are the secure session parameters associated with secure session #3. With knowledge of the secure session parameters associated with secure session #3, computing device 302 can read data sent by identity provider 304 via secure session #3 and also send data to identity provider 304 via secure session #3. Computing device 302 can communicate with identity provider 304 via secure session #3, illustrated as secure session #3 (324) in FIG. 3. Thus, computing device 302 can continue to communicate with identity provider 304 via a secure session, and the user credentials were provided to identity provider 304 by credential service 306 via a secure connection by way of computing device 302 despite computing device 302 having no knowledge of the user credentials.

System 300 is discussed with reference to renegotiating secure sessions. Alternatively, rather than using secure session renegotiation, credential service 306 can use secure session resumption. If using secure session resumption, one or more of the keys included in the secure session parameters associated with secure session #1 (and/or keys from which the keys included in the secure session parameters) are re-used and need not be re-generated by the credential service 306 and/or identity provider 304. Thus, rather than renegotiating secure session #1 to establish secure session #2, secure session #1 can be resumed to establish secure session #2. Similarly, rather than renegotiating secure session #2 to establish secure session #3, secure session #1 can be resumed to establish secure session #3. It should also be noted that if secure session resumption is used, then communication between credential service 306 and identity provider 304 does not pass through computing device 302; communication between credential service 306 and identity provider 304 bypasses computing device 302, so that computing device 302 is not operating as an intermediary between credential service 306 and identity provider 304.

Resuming secure session resumption can be performed in various manners using various techniques that are known to the parties involved (e.g., credential service 306 and identity provider 304). For example, a secure session can be performed using SSL resumption, or resumption as discussed in Network Working Group RFC 5077, "Transport Layer Security (TLS) Session Resumption without Server-Side State", January 2008.

It should be noted that, although not illustrated in FIG. 3, computing device 302 can renegotiate secure session #3, resulting in a new secure session #4 being established between identity provider 304 and computing device 302. The secure session parameters associated with secure session #4 would not be known to credential service 306, which would thus be unable to can read data sent via secure session #4 and unable to send data via secure session #4.

It should also be noted that, when secure session parameters are transferred from computing device 302 to credential service 306, or from credential service 306 to computing device 302, the secure session parameters are transferred in a secure manner to protect against any intervening devices obtaining the secure session parameters. The secure session parameters (as well as other data transferred between computing device 302 and credential service 306) can be transferred in a variety of different secure manners, such as computing device 302 encrypting the secure session parameters with a public key of a public/private key pair of credential service 306 or a secret key known to both computing device 302 and credential service 306, credential service 306 encrypting the secure session parameters with a public key of a public/private key pair of computing device 302 or a secret key known to both computing device 302 and credential service 306, and so forth.

Additionally, in one or more embodiments, secure session parameters (or at least security keys) are maintained by computing device 302 and credential service 306 in a secure manner. For example, the secure session parameters can be maintained in a Trusted Computing Base or Trusted Platform Module of computing device 302, and transferred to credential service 306 from the Trusted Computing Base or Trusted Platform Module of computing device 302 rather than a Web browser of computing device 302. Similarly, the secure session parameters can be maintained in a Trusted Computing Base or Trusted Platform Module of a device of credential service 306, and transferred to computing device 302 from the Trusted Computing Base or Trusted Platform Module of credential service 306 rather than other components or modules of credential service 306.

It should be noted that, as discussed above credential service 306 can communicate with identity provider 304 via a secure session in which computing device 302 is an intermediary, in which case identity provider 304 effectively believes that identity provider 304 is communicating with computing device 302 rather than credential service 306. Accordingly, in such situations no changes need be made to identity provider 304 to support the protecting user credentials from a computing device techniques discussed herein. Identity provider 304 continues to communicate with computing device 302 without any modifications to identity provider 304, allowing identity provider 304 to be oblivious to the fact that it is receiving user credentials from credential service 306.

It should also be noted that, although three secure sessions are illustrated in FIG. 3, a secure session can be renegotiated or resumed any number of times. For example, secure sessions can be renegotiated or resumed any number of times after establishing secure session #1 and prior to establishing secure session #2. By way of another example, secure sessions can be renegotiated or resumed any number of times after establishing secure session #2 and prior to establishing secure session #3.

Returning to FIG. 2, discussions are included herein regarding the communication of various data or information (e.g., at least part of user credentials, particular values, and so forth) between computing device 202 and credential service 206. Such data or information can be communicated in a variety of different secure manners, such as computing device 202 encrypting the data or information with a public key of a public/private key pair of credential service 206 or a secret key known to both computing device 202 and credential service 206, credential service 306 encrypting the data or information with a public key of a public/private key pair of computing device 202 or a secret key known to both computing device 202 and credential service 206, and so forth.

In one or more embodiments Web browser 214 prompts a user of computing device 202 that the user credentials can be provided by credential service 206, and a user input requesting that credential service 206 provide the user credentials can be received. The prompt to the user need not specify any part of the user credentials. Alternatively, Web browser 214 can display or otherwise present in the prompt at least part of the user credentials. For example, situations can arise in which a user has multiple different user credentials associated with the same Web service 204. In such situations, Web browser 214 can communicate with credential service 206 to obtain at least part of the user credentials (e.g., the user names but not passwords) associated with the Web service 204 that provided the Web page requesting user credentials. Web browser 214 can display in the prompt the various different obtained parts of the user credentials (e.g., the various user names) and receive a user selection of one of the user credentials (e.g., via selection of a menu option, button, icon, link, etc.). Web browser 214 communicates an indication of the selected one of the user credentials to credential service 206, which proceeds to provide the selected one of the user credentials (e.g., user name and password) to Web service 204 as discussed above.

By way of another example, Web browser 214 can communicate with credential service 206 to obtain at least part of the user credentials (e.g., the user name but not password) associated with the Web service 204 that provided the Web page requesting user credentials. Web browser 214 can display in the prompt the obtained part of the user credentials. E.g., if the user name associated with Web service 204 is "AliceTheGreat", then Web browser 214 can display a menu option, button, or link reciting "Click here to sign in as AliceTheGreat". If a user input requesting that the user credentials be provided to the Web service 204 is received, then Web browser 214 communicates an indication of the user request to credential service 206, which proceeds to provide the selected one of the user credentials (e.g., user name and password) to Web service 204 as discussed above.

Additionally, in one or more embodiments, multiple users can share the same credential service user account on credential service 206 but have different associated user accounts on Web services 204. These multiple users can authenticate themselves to credential service 206 in the same manner, and rely on computing device 202 (e.g., Web browser 214) to perform additional authentication to distinguish between the Web service 204 user credentials associated with the different users. The additional authentication to be performed can be identified in different manners, such as maintained by credential service 206 (e.g., as policy associated with the user credentials for the Web services 204, as discussed in more detail below), maintained by computing device 202, and so forth. For example, two users may have a credential service user account on credential service 206 for which they authenticate themselves to credential service 206 using the same user name (e.g., "JackAndJill") and password, but have different user accounts associated with the same Web service 204. Each user authenticates himself or herself to credential service 206 using that same user name (e.g., "JackandJill") and password, and provides additional authentication information (e.g., a fingerprint scan, PIN, etc.) to computing device 202 to authenticate themselves individually to a particular user account associated with a Web service 204. Computing device 202 authenticates the user to a particular user account associated with a Web service 204 (e.g., one user being authenticated to the user account on Web service 204 with the user name "Jack", and the other being authenticated to the user account on Web service 204 with the user name "Jill"), and provides an indication of that particular user account to credential service 206. At least part of the user credentials (e.g., the user name) can be displayed to the user at computing device 202 to allow the user to select which user account associated with a Web service 204 the user is authenticating to, or alternatively computing device 202 can automatically select the user account associated with a Web service 204 based on the additional authentication (e.g., automatically select the user account corresponding to the fingerprint or PIN the user provided).

As discussed above with reference to FIG. 3, credential service 206 can provide user credentials to Web service 204 in various manners, such as using an HTTPS Post request or an HTTP Put request. In one or more embodiments, Web browser 214 generates the HTTPS Post or HTTP Put request and provides the generated HTTPS Post or HTTP Put request to credential service 206. Credential service 206 adds the user credentials to the received HTTPS Post or HTTP Put request, and then provides the HTTPS Post or HTTP Put request to Web service 204 via the appropriate secure session. In situations in which Web browser 214 is aware of at least part of the user credentials (e.g., the user name), then the HTTPS Post or HTTP Put request generated by Web browser 214 can include the part of the user credentials known to Web browser 214, and credential service 206 can add the part of the user credentials not known to Web browser 214.

Figure 4:
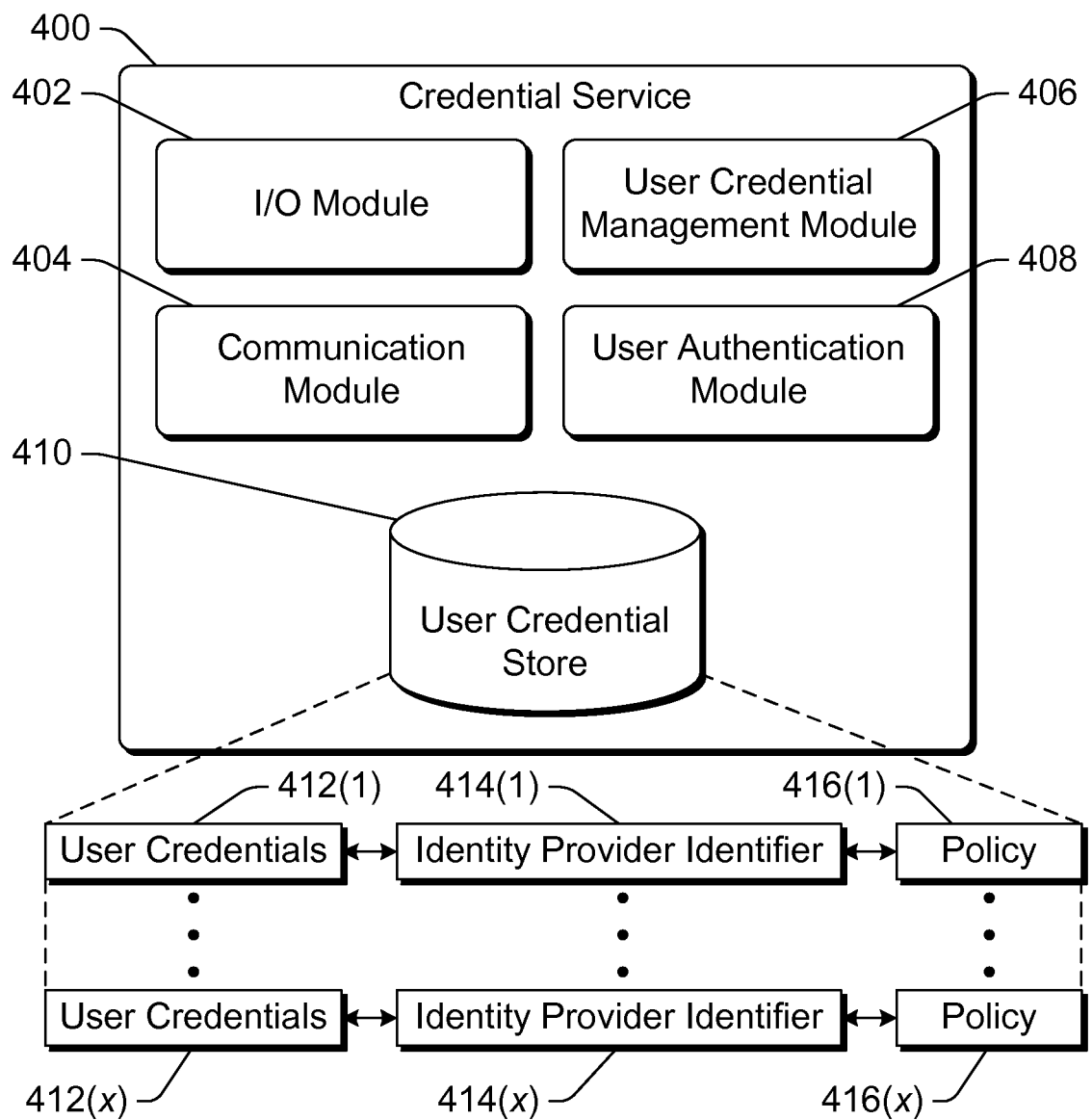
FIG. 4 illustrates an example credential service in accordance with one or more embodiments.

FIG. 4 illustrates an example credential service 400 in accordance with one or more embodiments. Credential service 400 can be, for example, a credential service 106 of FIG. 1, a credential service 206 of FIG. 2, and/or a credential service 306 of FIG. 3. Credential service 400 includes an input/output (I/O) module 402, a communication module 404, a user credential management module 406, a user authentication module 408, and a user credential store 410. It is to be appreciated that credential service 400 can also include one or more additional components or modules for providing various functionality of credential service 400. Modules 402, 404, 406, and 408 can be implemented in software, firmware, hardware, or combinations thereof. When implemented in software or firmware, each of modules 402, 404, 406, and 408 includes one or more instructions that are executed by a processor or controller. Modules 402, 404, 406, and 408 can be implemented as part of an operating system, or alternatively can be implemented separate from an operating system. Although illustrated as separate modules 402, 404, 406, and 408, it should be noted that the functionality of one or more modules 402, 404, 406, and 408 can be separated into multiple modules, and/or that at least some functionality of one or more modules 402, 404, 406, and 408 can be combined into a single module.

I/O module 402 receives user inputs from a user of credential service 400. These user inputs are typically received from another device (e.g., computing device 102 of FIG. 1, computing device 202 of FIG. 2, and/or computing device 302 of FIG. 3) and communicated to credential service 400. I/O module 402 also generates, manages, and/or outputs a user interface for credential service 400. This user interface displays or otherwise presents various information to a user of credential service 400, such as prompts to input user credentials associated with Web services, prompts to select user input credentials to be provided to Web services, and so forth. This user interface is typically communicated to and displayed or otherwise presented to the user at another device (e.g., computing device 102 of FIG. 1, computing device 202 of FIG. 2, and/or computing device 302 of FIG. 3).

Communication module 404 manages receiving of communications from and sending of communications to other components or services, such as computing device 102 of FIG. 1, computing device 202 of FIG. 2, and/or computing device 302 of FIG. 3. Communication module 404 can support a variety of different technologies and protocols, including wireless and/or wired technologies and protocols, for communicating via a variety of different networks or other connections or couplings.

User credential management module 406 manages user credentials that are maintained in user credential store 410, including retrieving user credentials, adding user credentials, changing user credentials, and/or deleting user credentials. User credential store 410 can be implemented in a variety of different manners, such as using a database, a table, or other record. User credential store 410 is typically, but need not be, maintained in nonvolatile memory, such as Flash memory, magnetic disk, and so forth. Although user credential store 410 is illustrated as part of credential service 400, alternatively user credential store can be maintained on another component or device that is accessible to credential service 400.

In the example of FIG. 4, user credential store 410 includes multiple (x) user credentials 412, each of which is associated with a particular identity provider identifier 414, and policy 416 for each of multiple credential service user accounts. User credentials can be input to credential service 400 directly by user inputs received via I/O module 402, or alternatively in other manners (e.g., from a user credential store on another device). For example, a user can input user credentials to another computing device, and have those user credentials communicated to credential service 400. Different types of user credentials can be used by different Web services as discussed above, so different ones of user credentials 412 can be different types of user credentials. In one or more embodiments, in addition to user credentials 412, additional user-specific information associated with a particular identity provider as discussed above can be maintained in user credential store, analogous to user credentials 412.

Each of user credentials 412 is associated with one or more identity provider identifiers 414. The identity provider identifier 414 associated with particular user credentials 412 is an identifier (e.g., URL, IP address, file share name, etc.) of a particular identity provider for which the particular user credentials can be used to authenticate the user. Although user credentials 412 are illustrated with a one-to-one association with identity provider identifiers 414, alternatively particular user credentials 412 can be associated with multiple identity provider identifiers 414, and/or a particular identity provider identifier 414 can be associated with multiple user credentials 412.

The association of particular user credentials 412 to a particular identity provider identifier 414 is typically identified when the user credentials are added to user credential store 410. The identification of the particular identity provider identifier 414 associated with particular user credentials 412 is typically received from the same source as the user credentials (e.g., a user of credential service 400, another computing device, a smartcard, and so forth). Alternatively, the identification of the particular identity provider identifier 414 associated with particular user credentials 412 can be received at different times and/or from different sources. For example, user credential management module 406 can receive user inputs via I/O module 402 to add an identity provider identifier 414 as being associated with particular user credentials 412 previously stored in user credential store 410, or to change the identity provider identifier 414 previously stored in user credential store 410 as associated with particular user credentials 412.

It should be noted that the user can provide inputs to change user credentials 412 at various times as desired by the user. User inputs to change user credentials can be received from various computing devices, and in one or more embodiments user credential management module 406 permits changes to user credentials only if the user inputs to change are from a known device (known devices are discussed in additional detail below). User credential management module 406 can optionally permit changes to user credentials only from a particular one or more devices (e.g., a known device that has been identified to credential service 400 as a cell or other wireless phone), and/or only when using a particular one or more types of communication (e.g., a short message service (SMS) message, a multimedia messaging service (MMS) message, etc.). Thus, for example, after a user has authenticated himself or herself to credential service 400 using an unknown device, he or she can change user credentials associated with a particular identity provider using a known device, and have those changed user credentials provided to the identity provider via a secure session with the unknown device as an intermediary. The user himself or herself can provide the changes to the user credentials, or alternatively request that another device or service (e.g., credential service 400) provide the changes (e.g., generate a new password).

It should be noted that a request for user credentials could also include a request to change user credentials. For example, a Web page 212 of FIG. 2 could be a request to change a password, requesting that the user credentials be entered and that a new password also be entered (to replace a previous password in the user credentials). Credential service 400 can automatically generate the new password and enter the new password on the Web page, allowing new user credentials to be generated) and maintained by credential service 400) without the user knowing the new user credentials. Credential service 400 can also be instructed to change a user's password in manners other than using a Web page, such as using any of various password change protocols (e.g., password change extensions of the Kerberos network authentication protocol).

When a request for user credentials is received, user authentication module 408 identifies the user credentials to provide to the identity provider. In one or more embodiments, the request includes an indication of the identity provider that the user desires to access. User authentication module 408 retrieves, from user credential store 410, the user credentials 412 associated with the indicated identity provider (the user credentials associated with the identity provider identifier 414 that identifies the indicated Web service) for the user authenticated to credential service 400, and communicates the retrieved user credentials 412 to the Web service as discussed above.

Situations can also arise in which multiple user credentials 412 are associated with the same identity provider identifier 414. In such situations, the user can be prompted (e.g., via the user interface provided by I/O module 402) to select one of the multiple user credentials. Upon receiving user selection of one of the multiple credentials, the user-selected user credentials are communicated to the Web service as discussed above.

In one or more embodiments, multiple different users can use credential service 400. Different user credentials 412 and associated identity provider identifiers 414 can be maintained for and associated with these different users, such as in different user credentials stores 410 or in different portions of user credential store 410. The particular user for which user credentials 412 are to be retrieved is the user having (associated with) the credential service user account for which the user authenticated himself or herself to credential service 400.

It should be noted that a user can change how he or she authenticates himself or herself to credential service 400 over time, such as changing a secret phrase, changing a private key corresponding to a certificate, and so forth. The manner in which the user authenticates himself or herself to credential service 400 can be changed in different ways. In one or more embodiments, once authenticated to credential service 400 from a computing device (e.g., computing device 102 of FIG. 1, computing device 202 of FIG. 2, and/or computing device 302 of FIG. 3), the user can access a password or authentication change screen or Web page provided by I/O module 402 where he or she can provide various inputs to identify the new manner in which he or she is to authenticate himself or herself to credential service 400 (e.g., the user can provide a new password). Alternatively, rather than providing inputs to identify the new manner in which he or she is to authenticate himself or herself to credential service 400 via such a computing device, credential service 400 can send a communication to an additional device associated with the credential service user account of the user (e.g., a known device as discussed in more detail below) to obtain the new manner in which he or she is to authenticate himself or herself to credential service 400. The user provides various user inputs to this additional device to identify the new manner in which he or she is to authenticate himself or herself to credential service 400 (e.g., the user can provide a new password), and the device in turn provides the user inputs to credential service 400.

User credentials 412 are also associated with a policy 416. Different user credentials 412 can be associated with different policies 416, or alternatively multiple user credentials 412 can be associated with the same policy 416. The policy 416 associated with particular user credentials 412 indicates conditions or criteria that are to be satisfied in order for credential service 400 to provide those user credentials 412 to an identity provider. In some situations, policy 416 can include no conditions or can be absent, indicating that user credentials can always be provided to an identity provider. Various different conditions or criteria can be included in policy 416. For example, the conditions or criteria can include an indication of which computers are known devices of the user (e.g., known devices as discussed in more detail below), an indication that a value is to be decrypted by the computing device (as discussed in more detail below), an indication that the computing device is to prove to credential service 400 that the computing device is free from known malware (e.g., the computing device is to prove that it is trusted), restrictions on a number of times user credentials can be used, restrictions on a number of times user credentials can be used in a particular span of time, restrictions on times of day that user credentials can be used, restrictions on locations of the user (e.g., the geographic location of the computing device), and so forth.

In one or more embodiments, user credentials 412 are maintained in a secure manner, such as being encrypted using a key of (e.g., a secret key known only to) credential service 400. Credential service 400 decrypts, based on this key, the user credentials 412 to provide to a Web service or other identity provider via a secure session as discussed above.

Credential service 400 can alternatively encrypt user credentials based on both a key of credential service 400 and a key of the computing device of the user. In one or more embodiments, a value (e.g., a master key used to encrypt and/or decrypt the user credentials, the user credentials themselves, etc.) is encrypted using both the key of credential service and a key of the computing device. For example, the user credentials (or a key used to decrypt the user credentials) can be encrypted using the key of the credential service and the result encrypted using the key of the computing device, the user credentials (or a key used to decrypt the user credentials) can be encrypted using the key of the computing device and the result encrypted using the key of the credential service, and so forth.

In one or more embodiments, to encrypt the value (e.g., a master key used to encrypt and/or decrypt the user credentials, the user credentials themselves, etc.), credential service 400 encrypts the value using a key of credential service 400 and communicates the encrypted value to the computing device, which in turn encrypts the received value (already encrypted using the key of credential service 400) using a key of the computing device and returns the encrypted value to credential service 400. To decrypt the value, credential service 400 communicates the encrypted value to the computing device. The user can be prompted (e.g., by the computing device itself) to confirm (by providing any of various user inputs) that he or she desires to have credential service 400 provide user credentials to the identity provider. If the user does not confirm that he or she desires to have credential service 400 provide user credentials to the identity provider, then the computing device does not decrypt the encrypted value. However, if the user does confirm that he or she desires to have credential service 400 provide user credentials to the identity provider, then the computing device decrypts the encrypted value using the key of the computing device. The computing device communicates the decrypted value to credential service 400, which further decrypts the received value using the key of credential service 400.

Thus, in situations in which user credentials are maintained encrypted based at least in part on a key obtained from the computing device of the user, the user is protected against malicious attacks against credential service 400. If an attacker were to compromise credential service 400, the attacker would still be unable to obtain the user credentials of the various users of credential service because the attacker would not have access to the keys from the computing devices of those various users.

In situations in which credential service 400 encrypts user credentials based on both a key of credential service 400 and a key of the computing device of the user, the key of the computing device can be placed on the computing device in various manners. In one or more embodiments, the computing device key is created and maintained by a hardware security module (HSM), such as a Trusted Platform Module, by one computing device (e.g., in response to a user input requesting that the computing device be used to authorize a credential service to provide user credentials of the user to identity providers). The HSM protects the computing device key, and can provide the computing device key to other computing devices requested by the user. The HSM encrypts the computing device key and provides the encrypted computing device key to one or more other computing devices (as requested by the user), allowing those one or more other computing devices to have access to the same computing device key and thus allowing the same computing device key to be the basis for encryption of the user credentials by credential service 400. Alternatively, different computing devices can have different computing device keys, and credential service 400 can maintain the user credentials encrypted in multiple different manners (e.g., one set of encrypted user credentials for each of the different computing device keys).

The HSM encrypts the computing device key (e.g., using the public key of a public/private key pair of another computing device) and provides the encrypted computing device key to the other computing device only if authorized to do so. Alternatively, an HSM of credential service 400 can maintain the computing device key, and the HSM of credential service 400 can encrypt the computing device key (e.g., using the public key of a public/private key pair of another computing device) and provide the encrypted computing device key to the other computing device only if authorized to do so. Regardless of which HSM provides the encrypted computing device key, whether the HSM is authorized to provide the computing device key to a computing device can be determined in various manners. For example, the HSM can require that the user provide various information proving their identity (e.g., their date of birth, the name of a pet, their mother's maiden name, a PIN, etc.) in order to be authorized to provide the computing device key to a computing device. By way of another example, the HSM can require that a certification from an existing known (or trusted) computing device be provided in order to be authorized to provide the computing device key to a computing device. By way of yet another example, the HSM can require an additional key (e.g., an enrollment key) be provided to the HSM in order to be authorized to provide the computing device key to a computing device.

Returning to FIG. 1, user-specific information in addition to or in place of user credentials can also be provided by credential service 106 to identity provider 104 as discussed above. For example, in addition to a user id and password, user-specific information such as a shipping address and credit card number can also be provided by credential service 106 to identity provider 104.

Additionally, in one or more embodiments user-specific information can be obtained by credential service 106 from one or more additional identity providers (not shown) and provided by credential service 106 to identity provider 104. The user-specific information is obtained by credential service 106 via one or more secure sessions with the additional identity providers without computing device 102 having knowledge of the user-specific information, analogous to the discussions above.

For example, referring to FIG. 2, assume that a Web service A and a Web service B are different Web services 204, and that Web service A is an online shopping Web service and Web service B is a financial Web service. A Web page 212 from Web service A can be a check-out page requesting a credit card number to purchase the items the user has selected. A user request can be received (e.g., selection of a menu item, button, icon, link, etc.) to have credential service 206 provide a credit card number to Web service A. In response to such a user request, credential service 206 obtains a credit card number associated with the user from Web service B, and provides that credit card number to the online shopping Web service 204. The credit card number can then be used to purchase the selected items from Web service A. The user request to have credential service 206 provide the credit card number to Web service A and the providing of the credit card number to Web service A by credential service 206 are analogous to the user request to have credential service 206 provide user credentials and the providing of user credentials by credential service 206 discussed above. However, rather than the credit card number being maintained by credential service 206 (as user credentials are maintained), credential service 206 obtains the credit card number from another service.

Web service B can be identified in different manners. In one or more embodiments, Web service user credentials 218 include user credentials for the user of computing device 202 that are associated with Web service B. If user credentials associated with multiple financial Web services are included in Web service user credentials 218 for the user, then the user can be prompted to select one of the multiple financial Web services (e.g., by user selection of a menu item, button, icon, link, and so forth). In response to a user request to have credential service 206 provide a credit card number to Web service A, Web browser 214 establishes a secure session with Web service B and provides the secure session parameters to credential service 206, allowing credential service 206 to renegotiate or resume the secure session and communicate with Web service B analogous to the discussion above. Credential service 206 provides to Web service B user credentials associated with Web service B for the user and requests a credit card number for the user. Web service B retrieves or generates a credit card number for the user and returns the credit card number to credential service 206. Credential service 206 can then provide the credit card number received from Web service B to Web service A via a secure session, analogous to the discussion above regarding credential service 206 providing user credentials.

The credit card number obtained from Web service B can be a credit card number for the user that is stored by Web service B, or alternatively a temporary or one-time credit card number. A temporary or one-time credit card number is a credit card number that is usable for a particular amount of time. The particular amount of time can vary, but is typically relatively short (e.g., 24 hours or less). The temporary or one-time credit card number can have a limited number of uses (e.g., Web service B can allow the credit card number to be used only once), can have a spending limit, and/or can be associated with a particular merchant or service. For example, a temporary or one-time credit card number can be limited to be used once, for up to a particular dollar amount at Web service A. The dollar amount and merchant or service associated with the credit card number can be provided to Web service B by credential service 206. For example, in response to a user request to have credential service 206 provide a credit card number to Web service A, Web browser 214 establishes a secure session with Web service B and provides both an indication of Web service A as well as a dollar amount (e.g., the total amount on the check-out page for Web service A) to credential service 206. Credential service 206 can provide the indication of Web service A as well as the dollar amount to Web service B. Web service B can maintain a record of the dollar amount and indication of Web service A as associated with the credit card number, and verify to a merchant or service that the credit card number can be used for a purchase only if the amount of the purchase is less than (and/or equal to) the dollar amount and the merchant or service is Web service A.

It should be noted that, alternatively, credit card numbers can be maintained by credential service 206 as user-specific information associated with the user. In such situations, credential service 206 can retrieve a credit card number associated with a user from a credential service 206 store (e.g., user credential store 410 of FIG. 4), and provide the credit card number to a Web service 204 analogous to the user credentials discussed above.

Returning to FIG. 1, credential service 106 can communicate with multiple computing devices 102. Different users can use the same and/or different computing devices 102, and in one or more embodiments credential service 106 maintains for each user account a record of known computing devices 102. This record can be maintained in various manners, such as in a user credential store (e.g., store 410 of FIG. 4, such as as part of policy 416), in another store, and so forth. A computing device 102 is referred to as a known computing device for a user if the user has indicated to credential service 106 that he or she trusts the computing device. A user can indicate that he or she trusts a computing device in various manners, such as using the computing device to establish his or her user account with credential service 106, selecting a "this is a known device" option (e.g., menu item, button, icon, link, etc.) after authenticating himself or herself to and logging into his or her account with credential service 106, and so forth.

Computing devices can be identified in a variety of different manners. Any technique that allows computing devices to be distinguished from one another can be used to identify the computing devices. For example, the Endorsement Keys (EKs) and Attestation Identity Keys (AIKs) of a Trusted Platform Module of a computing device 102 can be used as an identifier of a computing device. By way of another example, network adapters that computing devices 102 use to communicate with credential service 106 can have identifiers (e.g., Media Access Control (MAC) addresses) that can be used to identify the computing devices. By way of another example, hard drives or other storage devices of computing devices 102 can have identifiers that can be used to identify the computing devices. By way of another example, a combination (e.g., concatenation) of hardware identifier (e.g., MAC address or identifier of other hardware of the computing device) and user name (as used to login to a particular account on the computing device itself) can be used as an identifier of a computing device.

In one or more embodiments, a user authenticates himself or herself to credential service 106 in different manners based on whether the user is using a known device. Generally, if the user is using a known device then less information is used to authenticate the user than if the user is not using a known device. Using more information if the user is not using a known device allows protection against situations in which some of a user's information may be stolen (e.g., the user name and password for his or her credential service user account with credential service 106)—using additional information helps protect someone else from using the user's user name and password to access the user's account. For example, if the user is using a known device then a user name and password can be sufficient to authenticate the user to credential service 106, but other information may be needed in addition to the user name and password if the user is not using a known device. This other information can be information provided via the computing device itself (e.g., entry of the user's mother's maiden name, entry of an alphanumeric code sent to the user on another device (e.g., a text message sent to the user's cell phone by credential service 106), etc.) or via another device (e.g., respond, from the user's cell phone, to a text message sent to the user's cell phone by credential service 106).

Alternatively, a user can initially authenticate himself or herself to credential service 106 in the same manner regardless of whether the user is using a known device, but then provide additional information to authenticate himself or herself to credential service 106 in order for credential service 106 to provide user credentials to an identity provider. For example, if the user is using a known device and authenticates himself or herself to credential service 106 using some authentication protocol (e.g., any authentication protocol that credential service 106 chooses to offer), then credential service 106 provides the user credentials to an identity provider 104 in response to a subsequent user request that the user credentials be provided to the identity provider 104 by credential service 106. However, if the user is not using a known device and authenticates himself or herself to credential service 106 using that authentication protocol, then credential service 106 requests additional information from the user in response to a subsequent user request that the user credentials be provided to the identity provider 104 by credential service 106. This additional information can be information provided via the computing device itself (e.g., entry of the user's mother's maiden name, entry of an alphanumeric code sent to the user on another device (e.g., a text message sent to the user's cell phone by credential service 106), etc.) or via another device (e.g., respond, from the user's cell phone, to a text message sent to the user's cell phone by credential service 106). If the additional information authenticating the user is received then credential service 106 provides the user credentials to the identity provider 104, and if the additional information authenticating the user is not received then credential service 106 does not provide the user credentials to the identity provider.

Additionally, a user can revoke the known status of a computing device. The user can do so in various manners, such as by authenticating himself or herself to credential service 106 from a known computing device (or alternatively any computing device), and providing a user input to credential service 106 identifying a particular computing device that is no longer known. For example, credential service 106 can display or otherwise present a list of known computing devices to the user, and the user can select one or more that are no longer to be known. Thus, if a user were to no longer use a particular computing device, or have a computing device be lost or stolen, or have a computing device infected with a virus, the user can revoke the known status of that computing device.

A variety of different usage scenarios are supported by the protecting user credentials from a computing device discussed herein. For example, a user can establish different passwords for each of multiple different Web services or other identity providers, but need not remember all of the passwords. Rather, he or she can have the passwords maintained by the credential service as user credentials associated with the different Web services or other identity providers. Furthermore, the user can access those different Web services or other identity providers from various different computing devices without fear of the passwords being maintained on the computing devices because the credential service provides the passwords to the Web services or other identity providers in manner preventing the computing devices from seeing the passwords.

Figure 5:
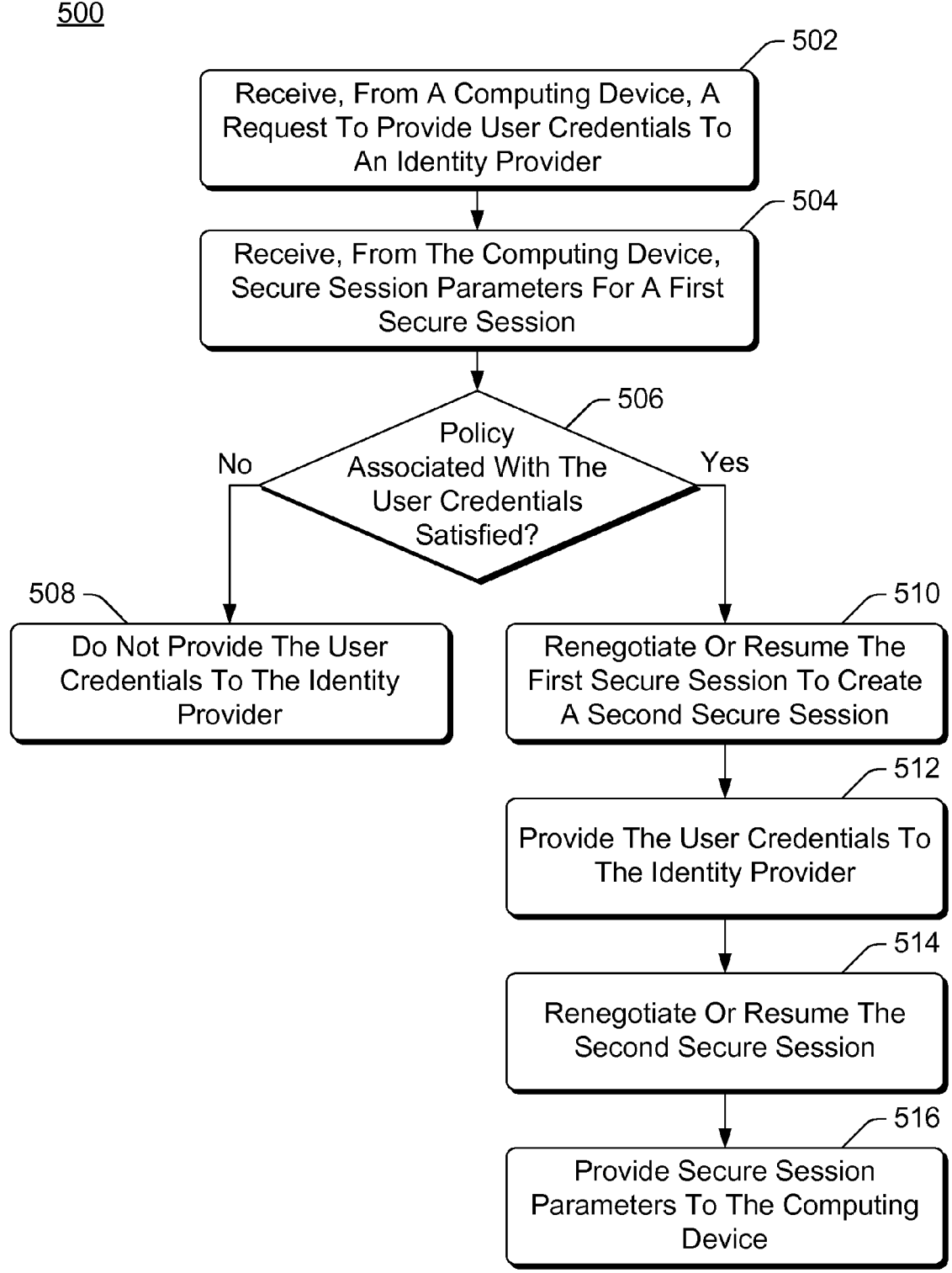
FIG. 5 is a flowchart illustrating an example process for protecting user credentials from a computing device in accordance with one or more embodiments.

FIG. 5 is a flowchart illustrating an example process 500 for protecting user credentials from a computing device in accordance with one or more embodiments. Process 500 is carried out by a credential service, such as credential service 106 of FIG. 1, credential service 206 of FIG. 2, credential service 306 of FIG. 3, and/or credential service 400 of FIG. 4, and can be implemented in software, firmware, hardware, or combinations thereof. Process 500 is shown as a set of acts and is not limited to the order shown for performing the operations of the various acts. Process 500 is an example process for protecting user credentials from a computing device; additional discussions of protecting user credentials from a computing device are included herein with reference to different figures.

In process 500, a request is received from a computing device to provide user credentials to an identity provider (act 502). The user credentials are associated with a user of the computing device and the identity provider, as discussed above.

Secure session parameters for a first secure session are also received from the computing device (act 504). The first secure session is a secure session between the computing device and the identity provider, and the secure session parameters can include various parameters (e.g., one or more keys, cookies, etc.) as discussed above.

A check is made as to whether policy associated with the user credentials is satisfied (act 506). Various different policies can be associated with the user credentials as discussed above.

If the policy associated with the user credentials is not satisfied, then the user credentials are not provided to the identity provider (act 508). However, if the policy associated with the user credentials is satisfied, then the credential service renegotiates or resumes the first secure session to create a second secure session (act 510). The second secure session is a secure session between the credential service and the identity provider, and the computing device may be an intermediary between the credential service and the identity provider, as discussed above. The secure session parameters can include various parameters (e.g., one or more keys, cookies, etc.) as discussed above.

The credential service provides the user credentials to the identity provider (act 512). The user credentials can be provided to the identity provider in different manners, such as using an HTTPS Post request as discussed above. Various policies can optionally be used to determine whether the credential service is to provide the user credentials to the identity provider, as discussed above. Additional information can also optionally be obtained from the user (e.g., if the user is not using a known device) before providing the user credentials to the identity provider, as discussed above.

The credential service renegotiates or resumes the second secure session (act 514). If the credential service renegotiates the second secure session, then the renegotiation establishes a third secure session is a secure session between the credential service and the identity provider, and the computing device may be an intermediary between the credential service and the identity provider, as discussed above. The secure session parameters can include various parameters (e.g., one or more keys, cookies, etc.) as discussed above.

The credential service provides the secure session parameters to the computing device (act 516). The secure session parameters can include various parameters (e.g., one or more keys, cookies, etc.) as discussed above. If the credential service renegotiates the second secure session in act 514 then the secure session parameters in act 516 are parameters for the third secure session. However, if the credential service resumes the second secure session in act 514 then the secure session parameters in act 516 are parameters for the second secure session.

Figure 6:
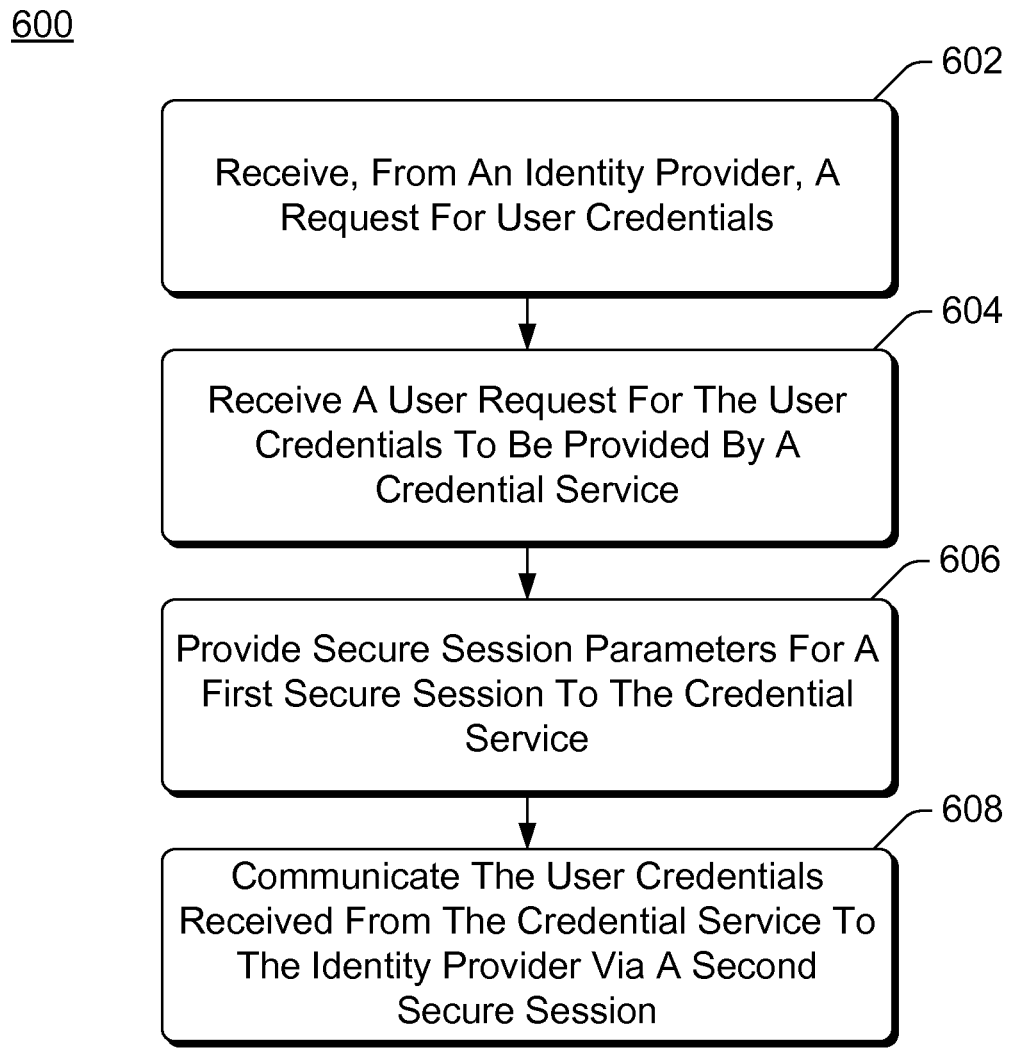
FIG. 6 is a flowchart illustrating another example process for protecting user credentials from a computing device in accordance with one or more embodiments.

FIG. 6 is a flowchart illustrating an example process 600 for protecting user credentials from a computing device in accordance with one or more embodiments. Process 600 is carried out by a computing device, such as computing device 102 of FIG. 1, computing device 202 of FIG. 2, and/or computing device 302 of FIG. 3, and can be implemented in software, firmware, hardware, or combinations thereof. Process 600 is shown as a set of acts and is not limited to the order shown for performing the operations of the various acts. Process 600 is an example process for protecting user credentials from a computing device; additional discussions of protecting user credentials from a computing device are included herein with reference to different figures.

In process 600, a request for user credentials is received from an identity provider (act 602). The user credentials are associated with a user of the computing device and the identity provider, as discussed above.

A user request for the user credentials to be provided by a credential service is received (act 604). The user request can be provided via various different user inputs as discussed above.

Secure session parameters for a first secure session are provided to the credential service (act 606). The first secure session is a secure session between the computing device and the identity provider, and the secure session parameters can include various parameters (e.g., one or more keys, cookies, etc.) as discussed above.

The computing device communicates the user credentials, received from the credential service, to the identity provider via a second secure session (act 608). The second secure session is a secure session between the credential service and the identity provider, created from renegotiating or resuming the first secure session as discussed above. The secure session parameters of the second secure session are not known to the computing device, and thus the user credentials are provided to the identity provider by the computing device although the computing device does not have knowledge of the user credentials.

Figure 7:
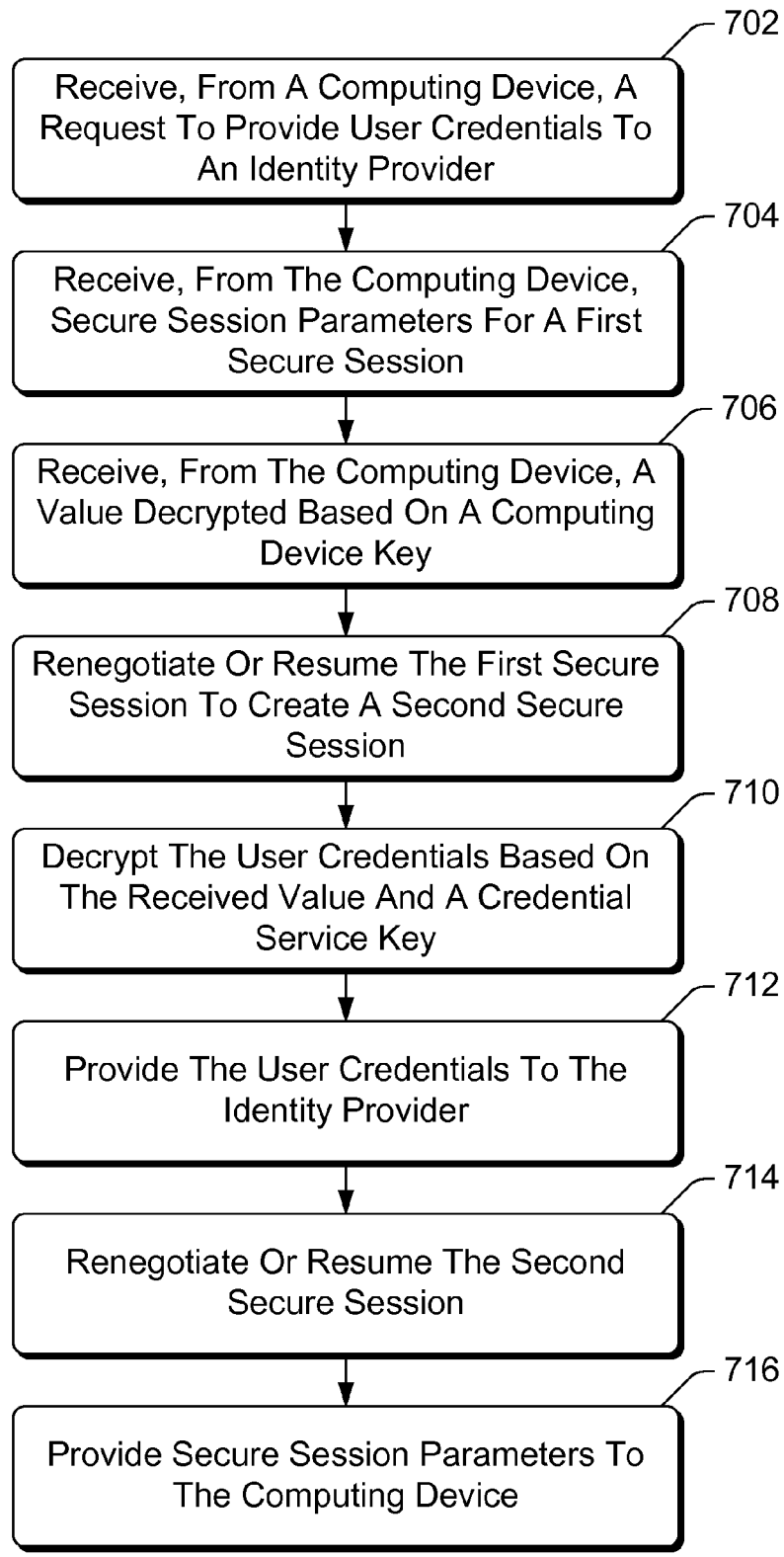
FIG. 7 is a flowchart illustrating another example process for protecting user credentials from a computing device in accordance with one or more embodiments.

FIG. 7 is a flowchart illustrating an example process 700 for protecting user credentials from a computing device in accordance with one or more embodiments. Process 700 is carried out by a credential service, such as credential service 106 of FIG. 1, credential service 206 of FIG. 2, credential service 306 of FIG. 3, and/or credential service 400 of FIG. 4, and can be implemented in software, firmware, hardware, or combinations thereof. Process 700 is shown as a set of acts and is not limited to the order shown for performing the operations of the various acts. Process 700 is an example process for protecting user credentials from a computing device; additional discussions of protecting user credentials from a computing device are included herein with reference to different figures.

In process 700, a request is received from a computing device to provide user credentials to an identity provider (act 702). The user credentials are associated with a user of the computing device and the identity provider, as discussed above.

Secure session parameters for a first secure session are also received from the computing device (act 704). The first secure session is a secure session between the computing device and the identity provider, and the secure session parameters can include various parameters (e.g., one or more keys, cookies, etc.) as discussed above.

A value decrypted by the computing device based on a computing device key is also received from the computing device (act 706). The value decrypted by the computing device can be an encrypted value provided to the computing device by the credential service, as discussed above. The computing device key can be, for example, a symmetric key as discussed above.

The credential service renegotiates or resumes the first secure session to create a second secure session (act 708). The second secure session is a secure session between the credential service and the identity provider, and the computing device may be an intermediary between the credential service and the identity provider, as discussed above. The secure session parameters can include various parameters (e.g., one or more keys, cookies, etc.) as discussed above.

The user credentials are maintained encrypted, and the credential service decrypts the user credentials (act 710). The user credentials are decrypted based on both the value received from the computing device in act 706 and a key of the credential service, as discussed above.

The credential service provides the user credentials to the identity provider (act 712). The user credentials can be provided to the identity provider in different manners, such as using an HTTPS Post request as discussed above. Various policies can optionally be used to determine whether the credential service is to provide the user credentials to the identity provider, as discussed above. Additional information can also optionally be obtained from the user (e.g., if the user is not using a known device) before providing the user credentials to the identity provider, as discussed above.

The credential service renegotiates or resumes the second secure session (act 714). If the credential service renegotiates the second secure session, then the renegotiation establishes a third secure session between the credential service and the identity provider, and the computing device may be an intermediary between the credential service and the identity provider, as discussed above. The secure session parameters can include various parameters (e.g., one or more keys, cookies, etc.) as discussed above.

The credential service provides the secure session parameters to the computing device (act 716). The secure session parameters can include various parameters (e.g., one or more keys, cookies, etc.) as discussed above. If the credential service renegotiates the second secure session in act 714 then the secure session parameters in act 716 are parameters for the third secure session. However, if the credential service resumes the second secure session in act 714 then the secure session parameters in act 716 are parameters for the second secure session.

Figure 8:
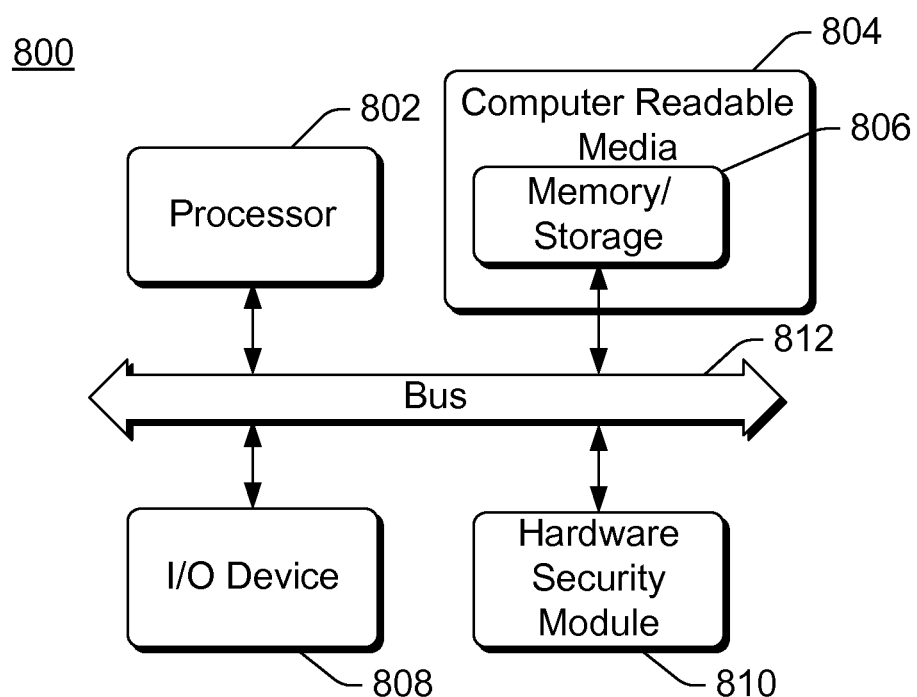
FIG. 8 illustrates an example computing device that can be configured to implement the protecting user credentials from a computing device in accordance with one or more embodiments.

FIG. 8 illustrates an example computing device 800 that can be configured to implement the protecting user credentials from a computing device in accordance with one or more embodiments. Computing device 800 can be, for example, computing device 102 of FIG. 1, computing device 202 of FIG. 2, and/or computing device 302 of FIG. 3, and/or can implement at least part of identity provider 104 of FIG. 1, credential service 106 of FIG. 1, a Web service 204 of FIG. 2, credential service 206 of FIG. 2, identity provider 304 of FIG. 3, credential service 306 of FIG. 3, and/or credential service 400 of FIG. 4.

Computing device 800 includes one or more processors or processing units 802, one or more computer readable media 804 which can include one or more memory and/or storage components 806, one or more input/output (I/O) devices 808, a hardware security module (HSM) 812, and a bus 812 that allows the various components and devices to communicate with one another. Computer readable media 804 and/or one or more I/O devices 808 can be included as part of, or alternatively may be coupled to, computing device 800. Processor 802, computer readable media 804, one or more of devices 808, HSM 810, and/or bus 812 can optionally be implemented as a single component or chip (e.g., a system on a chip). Bus 812 represents one or more of several types of bus structures, including a memory bus or memory controller, a peripheral bus, an accelerated graphics port, a processor or local bus, and so forth using a variety of different bus architectures. Bus 812 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802 and/or components (e.g., processors) of HSM 810. It is to be appreciated that different instructions can be stored in different components of computing device 800, such as in a processing unit 802, in various cache memories of a processing unit 802, in other cache memories of device 800 (not shown), in HSM 810, on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

HSM 810 can be, for example, a Trusted Platform Module as discussed above. HSM 810 maintains keys (or encrypts and/or decrypts keys) and performs various key-based operations for computing device 800 (e.g., generation of keys, encrypting data or values based on keys, decrypting data or values based on keys, and so forth).

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the protecting user credentials from a computing device techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a credential service, the method comprising:
   receiving at the credential service, from a computing device, both a request to provide user credentials associated with a user of the computing device to an identity provider and first secure session parameters for a first secure session previously established between the computing device and the identity provider, the credential service being implemented by one or more additional computing devices separate from the computing device;
   receiving, from the computing device, information authenticating the user to the credential service in order for the user credentials to be provided to the identity provider, with an amount of information used to authenticate being greater if the computing device is an unknown device than if the computing device is a known device;
   negotiating and establishing, using second secure session parameters, a second secure session between the credential service and the identity provider while using the computing device as an intermediary communicating data between the credential service and the identity provider, the second secure session parameters being unknown to the computing device and agreed based on renegotiation of the first secure session;
   providing the user credentials associated with the user to the identity provider via the second secure session;
   communicating from the credential service with the identity provider to renegotiate the second secure session and establish, using third secure session parameters determined during the second secure session, a third secure session between the credential service and the identity provider while using the computing device as an intermediary communicating data between the credential service and the identity provider; and
   providing the third secure session parameters to the computing device to allow communication between the computing device and the identity provider using the third secure session parameters.

2. The method as recited in claim 1, the identity provider being one of multiple identity providers, the method further comprising:
   maintaining multiple different user credentials associated with the user, each of the multiple different user credentials being associated with a different one of the multiple identity providers; and
   identifying, based on the identity provider, which of the multiple different user credentials to provide as the user credentials.

3. The method as recited in claim 1, the secure session parameters for the first secure session comprising a Secure Sockets Layer (SSL) key, one or more sequence numbers, and a channel binding token.

4. The method as recited in claim 1, the user credentials comprising a user name and password.

5. The method as recited in claim 1, further comprising:
   maintaining the user credentials encrypted;
   receiving, from the computing device, a value decrypted based on a key of the computing device; and
   decrypting, based on both the key of the credential service and the value decrypted based on the key of the computing device, the user credentials prior to providing the user credentials to the identity provider.

6. The method as recited in claim 1, further comprising:
obtaining, from an additional identity provider in response to a user request for a temporary credit card number, a temporary credit card number associated with the identity provider; and
providing the temporary credit card number to the identity provider without the computing device having knowledge of the temporary credit card number.

7. The method as recited in claim 1, further comprising maintaining a record of which devices are known devices for the user, and allowing a known status of any one or more of the known devices to be revoked.

8. The method as recited in claim 1, further comprising receiving one or more of a shipping address and a credit card number from the user, and providing the shipping address or credit card number to the identity provider.

9. The method as recited in claim 1, further comprising:
maintaining, associated with the user credentials, a policy indicating one or more conditions that are to be satisfied in order for the user credentials to be provided to the identity provider; and
providing the user credentials to the identity provider only if the one or more conditions are satisfied.

10. The method as recited in claim 9, wherein the conditions included in the policy include one or more of an indication of which devices are known devices of the user and an indication that a value is to be decrypted by the computing device.

11. The method as recited in claim 9, wherein the conditions included in the policy include one or more of an indication that the computing device is to prove to the credential service that the computing device is free from known malware, restrictions on a number of times user credentials can be used, restrictions on times of day that user credentials can be used, and restrictions on locations of the computing device.

12. A computing device comprising:
one or more processors; and
one or more computer-readable storage memories having stored thereon multiple instructions that, when executed by the one or more processors, cause the one or more processors to:
receive, at the computing device, from an identity provider, a request for user credentials of a user of the computing device;
receive, at the computing device, a user request for the user credentials associated with the identity provider to be provided by a credential service, the credential service being implemented by one or more additional computing devices separate from the computing device;
receive user input to authenticate the user to the credential service in order for the credential service to provide the user credentials to the identity provider, with an amount of information used to authenticate being greater if the computing device is an unknown device than if the computing device is a known device;
negotiate and establish, using first secure session parameters, a first secure session between the computing device and the identity provider;
provide, by the computing device to the credential service and in response to the user request, the first secure session parameters;
facilitate communication between the credential service and the identity provider for a second secure session renegotiated by the credential service from the first secure session;
receive, at the computing device from the credential service, the user credentials via the second secure session;
communicate, by the computing device to the identity provider via the second secure session, the user credentials;
receive, at the computing device from the credential service, third secure session parameters for a third secure session between the credential service and the identity provider, the third secure session parameters having been determined based on renegotiation of the second secure session; and
communicate, by the computing device, with the identity provider using the third secure session.

13. The computing device as recited in claim 12, the instructions causing the one or more processors to receive the request for user credentials and to receive the user request being included in a Web browser of the computing device.

14. The computing device as recited in claim 13, the identity provider comprising a Web service, and the instructions causing the one or more processors to receive the request for user credentials comprising instructions causing the one or more processors to automatically detect a Web page, received from the Web service, that is requesting user credentials of the user.

15. The computing device as recited in claim 12, the multiple instructions further causing the one or more processors to:
receive, from the credential service, an indication of at least part of each of multiple user credentials associated with both the user and the identity provider;
display the at least part of each of multiple user credentials associated with both the user and the identity provider; and
receive, as the user request, a user selection of one of the at least part of each of multiple user credentials associated with both the user and the identity provider.

16. The computing device as recited in claim 12, the instructions causing the one or more processors to communicate the user credentials received from the credential service to the identity provider without knowledge on the part of the identity provider that the second secure session is between the identity provider and the credential service.

17. The computing device as recited in claim 12, the multiple instructions further causing the one or more processors to:
receive, from the credential service, a value;
receive a user request confirming that the credential service is to provide the user credentials to the identity provider; and
in response to the user request confirming that the credential service is to provide the user credentials to the identity provider, decrypt the value and return the decrypted value to the credential service.

18. A method implemented by a credential service, the method comprising:
receiving at the credential service, from a computing device, a request to provide to an identity provider user credentials associated with both a user of the computing device and the identity provider, the user credentials being maintained encrypted by the credential service, the credential service being implemented by one or more additional computing devices separate from the computing device;
receiving, at the credential service from the computing device, first secure session parameters, the first secure session parameters received being the same secure session parameters previously used to negotiate and establish a first secure session between the computing device and the identity provider;

receiving, from the computing device, information authenticating the user to the credential service in order for the user credentials to be provided to the identity provider, with an amount of information used to authenticate being greater if the computing device is an unknown device than if the computing device is a known device;

receiving, from the computing device, a value decrypted based on a computing device key;

communicating from the credential service with the identity provider to renegotiate the first secure session to negotiate and establish, using second secure session parameters agreed upon based on renegotiation of the first secure session, a second secure session between the credential service and the identity provider while using the computing device to facilitate communication of data between the credential service and the identity provider, the second secure session parameters being unknown to the computing device;

decrypting, based on the value and a credential service key, the user credentials;

providing the user credentials associated with the user to the identity provider via the second secure session;

communicating from the credential service with the identity provider to resume the first secure session and establish, using third secure session parameters determined during the second secure session, a third secure session between the credential service and the identity provider while using the computing device as an intermediary communicating data between the credential service and the identity provider; and providing, to the computing device, secure session parameters for the third secure session to allow communication between the computing device and the identity provider using the third secure session parameters.

19. The method of claim 18, the secure session parameters for the first secure session comprising a Secure Sockets Layer (SSL) key, one or more sequence numbers, and a channel binding token.

20. The method of claim 18, the user credentials comprising a user name and password.

* * * * *